(12) United States Patent
Bennett et al.

(10) Patent No.: US 9,204,138 B2
(45) Date of Patent: Dec. 1, 2015

(54) USER CONTROLLED REGIONAL DISPLAY OF MIXED TWO AND THREE DIMENSIONAL CONTENT

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 854 days.

(21) Appl. No.: 12/982,309

(22) Filed: Dec. 30, 2010

(65) Prior Publication Data

US 2011/0157172 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/04* (2006.01)
(Continued)

(52) U.S. Cl.
CPC ............ *H04N 13/0456* (2013.01); *G03B 35/24* (2013.01); *G06F 3/14* (2013.01); *G09G 3/003* (2013.01); *G09G 3/20* (2013.01);
(Continued)

(58) Field of Classification Search
CPC .......... H04N 13/0404; H04N 13/0409; H04N 13/0029; H04N 13/0048; G06F 3/14; G02B 6/00; G09G 3/20; G09G 5/003; G09G 5/14; G09G 2300/023; G09G 2320/028; G09G 2370/04

USPC ................ 345/419, 102; 348/51, 55, 59, 564; 349/15

See application file for complete search history.

(56) References Cited

U.S. PATENT DOCUMENTS 4,829,365 A 5/1989 Eichenlaub
5,493,427 A 2/1996 Nomura et al.
(Continued)

FOREIGN PATENT DOCUMENTS

EP 0833183 A1 4/1998
EP 1662808 A1 5/2006
(Continued)

OTHER PUBLICATIONS

"How browsers work", retrieved from <http://taligarsiel.com/Projects/howbrowserswork1.htm> on Oct. 21, 2010, 54 pages.
(Continued)

*Primary Examiner* — Phu K Nguyen
(74) *Attorney, Agent, or Firm* — Fiala & Weaver P.L.L.C.

(57) ABSTRACT

Techniques are described herein for supporting user controlled regional display of mixed two and three dimensional content. A display system includes a pixel array, a screen assembly, and a screen surface. The screen assembly and the pixel array are controlled to cause various settings for a regionally adjustable characteristic of the screen assembly to be applied to respective regions of the screen assembly. Each setting specifies a value of the regionally adjustable characteristic that is to control or affect a visual characteristic that is associated with content that is to be presented in the corresponding region. A user may provide an input signal that specifies setting(s) for the regionally adjustable characteristic with respect to specified region(s) of the screen assembly.

20 Claims, 22 Drawing Sheets

US 9,204,138 B2
Page 2

(51) Int. Cl.
*H04N 13/00* (2006.01)
*G06F 3/14* (2006.01)
*G09G 3/00* (2006.01)
*G09G 3/20* (2006.01)
*H04N 21/235* (2011.01)
*H04N 21/41* (2011.01)
*H04N 21/435* (2011.01)
*G03B 35/24* (2006.01)
*H04S 7/00* (2006.01)
*G06F 3/0346* (2013.01)
*G02B 6/00* (2006.01)
*G09G 5/00* (2006.01)
*G09G 5/14* (2006.01)

(52) U.S. Cl.
CPC .......... *H04N 13/00* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0413* (2013.01); *H04N 13/0429* (2013.01); *H04N 13/0447* (2013.01); *H04N 13/0454* (2013.01); *H04N 13/0468* (2013.01); *H04N 13/0484* (2013.01); *H04N 13/0497* (2013.01); *H04N 21/235* (2013.01); *H04N 21/4122* (2013.01); *H04N 21/435* (2013.01); *H04S 7/303* (2013.01); *G02B 6/00* (2013.01); *G06F 3/0346* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

(56) References Cited

U.S. PATENT DOCUMENTS

| | | | |
|---|---|---|---|
| 5,615,046 A | 3/1997 | Gilchrist | |
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 | 4/2008 | Jacobs et al. | |
| 7,389,214 B1 | 6/2008 | Yelich et al. | |
| 7,440,193 B2 | 10/2008 | Gunasekaran et al. | |
| 7,511,774 B2 | 3/2009 | Lee et al. | |
| 7,557,876 B2 | 7/2009 | Lazarev et al. | |
| 7,626,644 B2 | 12/2009 | Shestak et al. | |
| 7,646,451 B2 | 1/2010 | Vogel et al. | |
| 7,671,935 B2 | 3/2010 | Mather et al. | |
| 7,692,859 B2 | 4/2010 | Redert et al. | |
| 7,769,668 B2 | 8/2010 | Balabon | |
| 7,885,079 B2 | 2/2011 | Chen et al. | |
| 7,911,442 B2 | 3/2011 | Wang et al. | |
| 7,924,456 B1 | 4/2011 | Kahn et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,044,983 B2 | 10/2011 | Nonaka et al. | |
| 8,049,710 B2* | 11/2011 | Shestak et al. | 345/102 |
| 8,072,411 B2 | 12/2011 | Chen et al. | |
| 8,139,024 B2* | 3/2012 | Daiku | 345/102 |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,183,788 B2 | 5/2012 | Ma | |
| 8,209,396 B1 | 6/2012 | Raman et al. | |
| 8,233,034 B2* | 7/2012 | Sharp et al. | 348/51 |
| 8,284,119 B2 | 10/2012 | Kim et al. | |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,368,749 B2 | 2/2013 | Lambdin et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,438,601 B2 | 5/2013 | Putterman et al. | |
| 8,441,430 B2 | 5/2013 | Lee | |
| 8,466,869 B2 | 6/2013 | Kobayashi et al. | |
| 8,482,512 B2* | 7/2013 | Adachi et al. | 345/102 |
| 8,487,863 B2* | 7/2013 | Park et al. | 345/102 |
| 8,525,942 B2* | 9/2013 | Robinson et al. | 349/15 |
| 8,587,642 B2 | 11/2013 | Shestak et al. | |
| 8,587,736 B2 | 11/2013 | Kang | |
| 8,605,136 B2 | 12/2013 | Yu et al. | |
| 8,687,042 B2* | 4/2014 | Karaoguz et al. | 348/42 |
| 8,736,659 B2 | 5/2014 | Liu | |
| 8,766,905 B2 | 7/2014 | Adachi | |
| 8,788,676 B2 | 7/2014 | Alameh et al. | |
| 8,823,782 B2 | 9/2014 | Karaoguz et al. | |
| 8,854,531 B2 | 10/2014 | Karaoguz et al. | |
| 8,885,026 B2 | 11/2014 | Endo | |
| 8,922,545 B2 | 12/2014 | Bennett et al. | |
| 8,964,013 B2 | 2/2015 | Bennett et al. | |
| 8,988,506 B2 | 3/2015 | Bennett et al. | |
| 9,019,263 B2 | 4/2015 | Bennett et al. | |
| 9,049,440 B2 | 6/2015 | Seshadri et al. | |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2002/0194604 A1 | 12/2002 | Sanchez et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0081302 A1 | 4/2004 | Kim et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |
| 2004/0252187 A1 | 12/2004 | Alden | |
| 2004/0255337 A1 | 12/2004 | Doyle et al. | |
| 2005/0044489 A1 | 2/2005 | Yamagami et al. | |
| 2005/0073472 A1 | 4/2005 | Kim et al. | |
| 2005/0128353 A1 | 6/2005 | Young et al. | |
| 2005/0185281 A1 | 8/2005 | Perlin et al. | |
| 2005/0185515 A1 | 8/2005 | Berstis et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0026090 A1 | 2/2006 | Balabon | |
| 2006/0050785 A1 | 3/2006 | Watanabe et al. | |
| 2006/0087556 A1 | 4/2006 | Era | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0262376 A1 | 11/2006 | Mather et al. | |

(56) References Cited

U.S. PATENT DOCUMENTS

| | | |
|---|---|---|
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |
| 2007/0147827 A1 | 6/2007 | Sheynman et al. |
| 2007/0153122 A1 | 7/2007 | Ayite et al. |
| 2007/0153916 A1 | 7/2007 | Demircin et al. |
| 2007/0162392 A1 | 7/2007 | McEnroe et al. |
| 2007/0225994 A1 | 9/2007 | Moore |
| 2007/0226258 A1 | 9/2007 | Lambdin et al. |
| 2007/0244068 A1 | 10/2007 | Han et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0086685 A1 | 4/2008 | Janky et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0244266 A1 | 10/2009 | Brigham |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0045782 A1 | 2/2010 | Morita |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ideda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0064146 A1 | 3/2011 | Chen et al. |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2015/0015668 A1 | 1/2015 | Bennett et al. |
| 2015/0156473 A1 | 6/2015 | Bennett et al. |

FOREIGN PATENT DOCUMENTS

| | | |
|---|---|---|
| EP | 1816510 A1 | 8/2007 |
| EP | 1993294 A2 | 11/2008 |
| GB | 2454771 A | 5/2009 |
| TW | 200938878 A | 9/2009 |
| WO | 2005/045488 A1 | 5/2005 |
| WO | 2007/024118 A1 | 3/2007 |
| WO | 2008038068 A1 | 4/2008 |
| WO | 2008/126557 A1 | 10/2008 |

(56) References Cited

FOREIGN PATENT DOCUMENTS

WO    2009/031872 A2    3/2009
WO    2009/098622 A2    8/2009

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", Ph.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa, "Stereoscopic Display Technique for Web3D Images", SIGGRAPH 2009, New Orleans, Louisiana, Aug. 3-7, 2009, 1 page.

Fono, et al.,"EyeWindows: Evaluation of Eye-Controlled Zooming Windows for Focus Selection",CHI 2005, Papers: Eyes on Interaction, Portland, Oregon, Apr. 2-7, 2005,pp. 151-160.

Kumar et al.,"Eye Point: Practical Pointing and Selection Using Gaze and Keyboard",CHI 2007, Apr. 28-May 3, 2007, 10 pages.

Intel,"Displaying Stereoscopic 3D (S3D) with Intel HD Graphics Processors for Software Developers", Aug. 2011, pp. 1-10.

Liao, et al.,"The Design and Application of High-Resolution 3D Stereoscopic graphics Display on PC",Purdue University School of Science, 2000, 7 pages.

Office Action Received for Chinese Patent Application No. 201010619646.3, mailed on Mar. 31, 2014, 7 pages of Chinese Office action only.

Office Action Received for Chinese Patent Application No. 201010619646.x, mailed on Mar. 5, 2014, 4 pages of Chinese Office action only.

Office Action Received for Taiwan Patent Application No. 099147124, mailed on Mar. 31, 2014, 8 pages.

Office Action received for Chinese Patent Application No. 201010619649.3, mailed on Oct. 11, 2014, 5 pages.

Ko et al., "Facial Feature Tracking and Head Orientation-Based Gaze Tracking", ETRI, 2005, 4 pages.

Ruddarraju et al., "Perceptual User Interfaces using Vision-Based Eye Tracking", ICMI, Nov. 5-7, 2003, 7 pages.

* cited by examiner

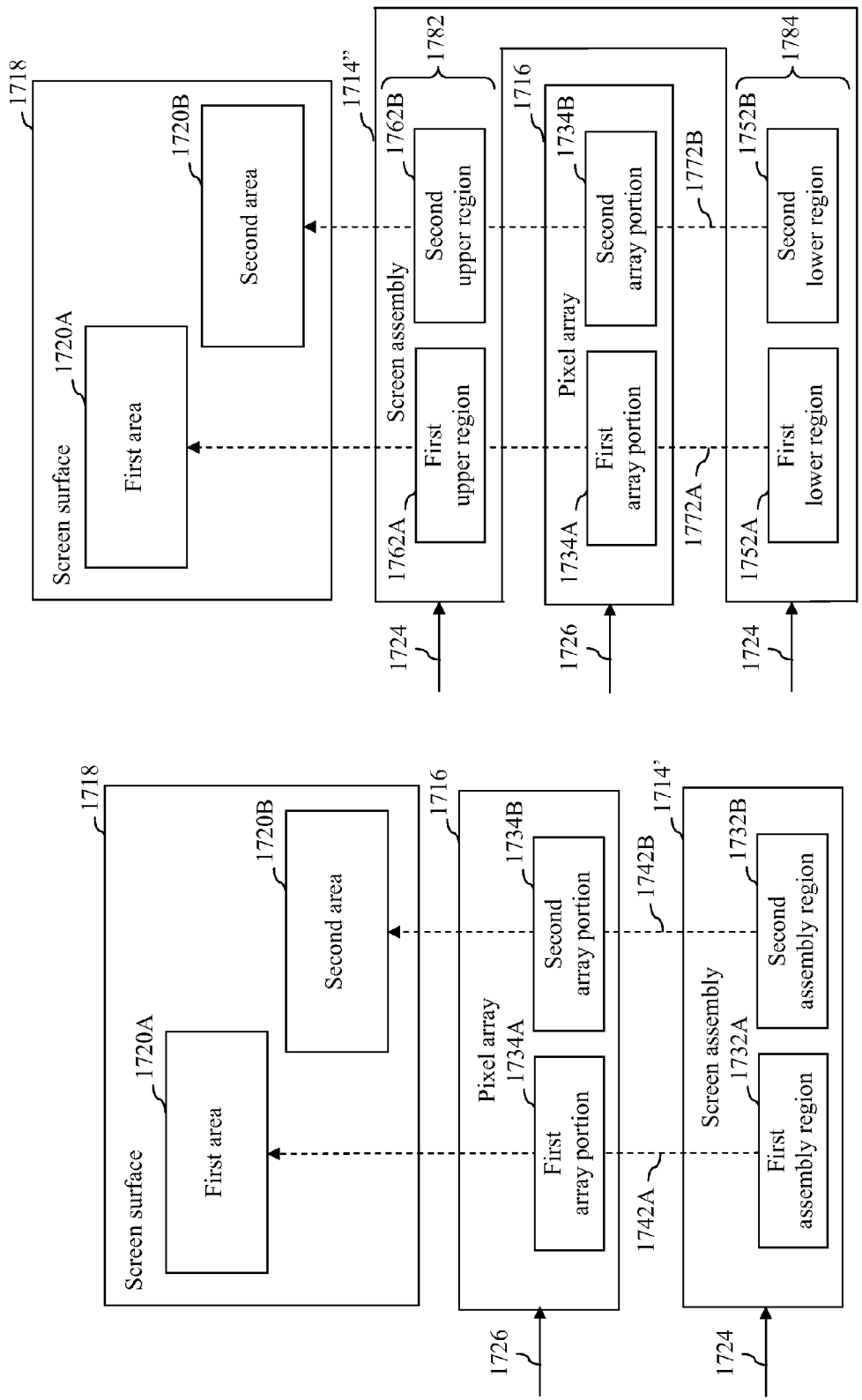

USER CONTROLLED REGIONAL DISPLAY OF MIXED TWO AND THREE DIMENSIONAL CONTENT

CROSS-REFERENCE TO RELATED APPLICATIONS

This application claims the benefit of U.S. Provisional Application No. 61/291,818, filed on Dec. 31, 2009, which is incorporated by reference herein in its entirety.

This application also claims the benefit of U.S. Provisional Application No. 61/303,119, filed on Feb. 10, 2010, which is incorporated by reference herein in its entirety.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/774,225, filed on May 5, 2010, and entitled "Controlling a Pixel Array to Support an Adaptable Light Manipulator";

U.S. patent application Ser. No. 12/774,307, filed on May 5, 2010, and entitled "Display with Elastic Light Manipulator";

U.S. patent application Ser. No. 12/845,409, filed on Jul. 28, 2010, and entitled "Display With Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views";

U.S. patent application Ser. No. 12/982,020, filed on even date herewith and entitled "Backlighting Array Supporting Adaptable Parallax Barrier"; and U.S. patent application Ser. No. 12/982,031, filed on even date herewith and entitled "Coordinated Driving of Adaptable Light Manipulator, Backlighting and Pixel Array in Support of Adaptable 2D and 3D Displays".

BACKGROUND OF THE INVENTION

1. Field of the Invention

The present invention relates to user controlled regional display of content on three-dimensional image displays.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two dimensions. More recently, images are being provided in digital form for display in two dimensions on display devices having improved resolution (e.g., "high definition" or "HD"). Even more recently, images capable of being displayed in three dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye liquid crystal display (LCD) shutter glasses may be used with conventional two-dimensional image displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes of a layer of material with a series of precision slits. The parallax barrier is placed proximal to a display so that each of a user's eyes sees a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

Methods, systems, and apparatuses are described for supporting user controlled regional display of mixed two and three dimensional content as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 12:
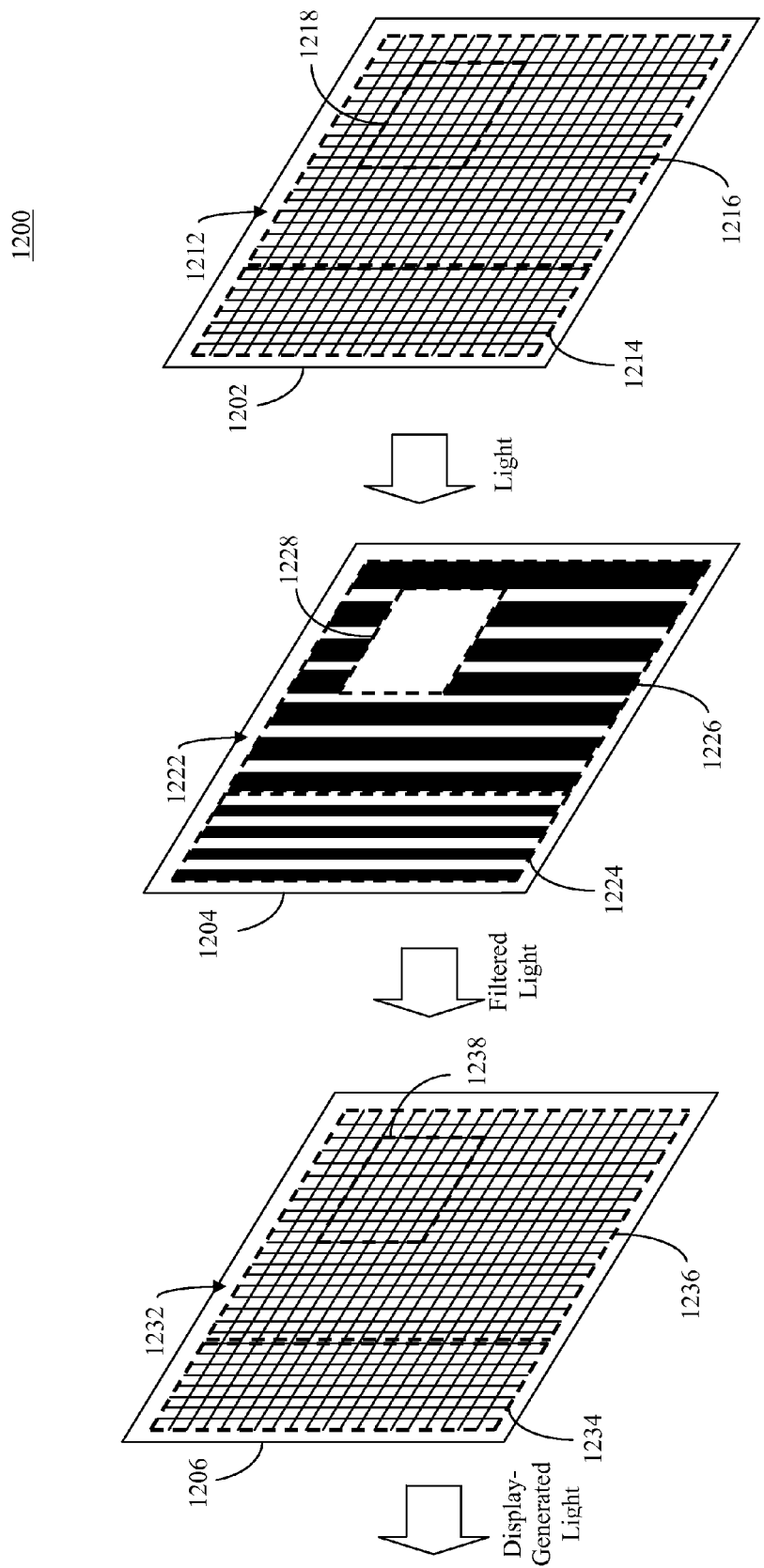

FIG. 12 provides an exploded view of an exemplary display system that utilizes a controllable backlight array to provide regional luminosity control in accordance with an embodiment.

Figure 13:
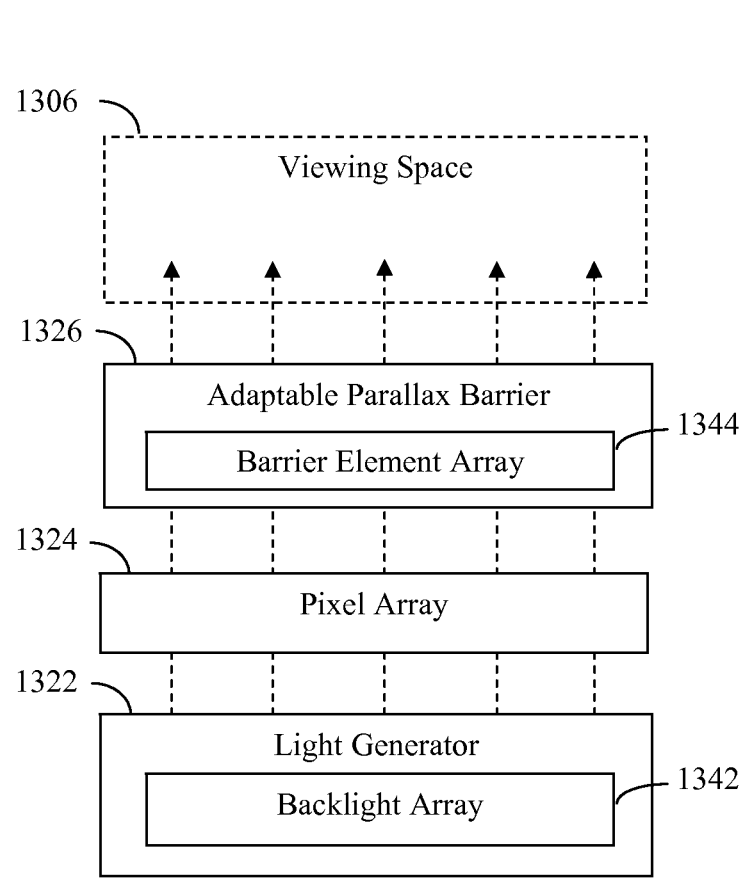

FIG. 13 is a block diagram of an exemplary display system that includes a pixel array disposed between a light generator and an adaptable parallax barrier in accordance with an embodiment.

Figure 14:
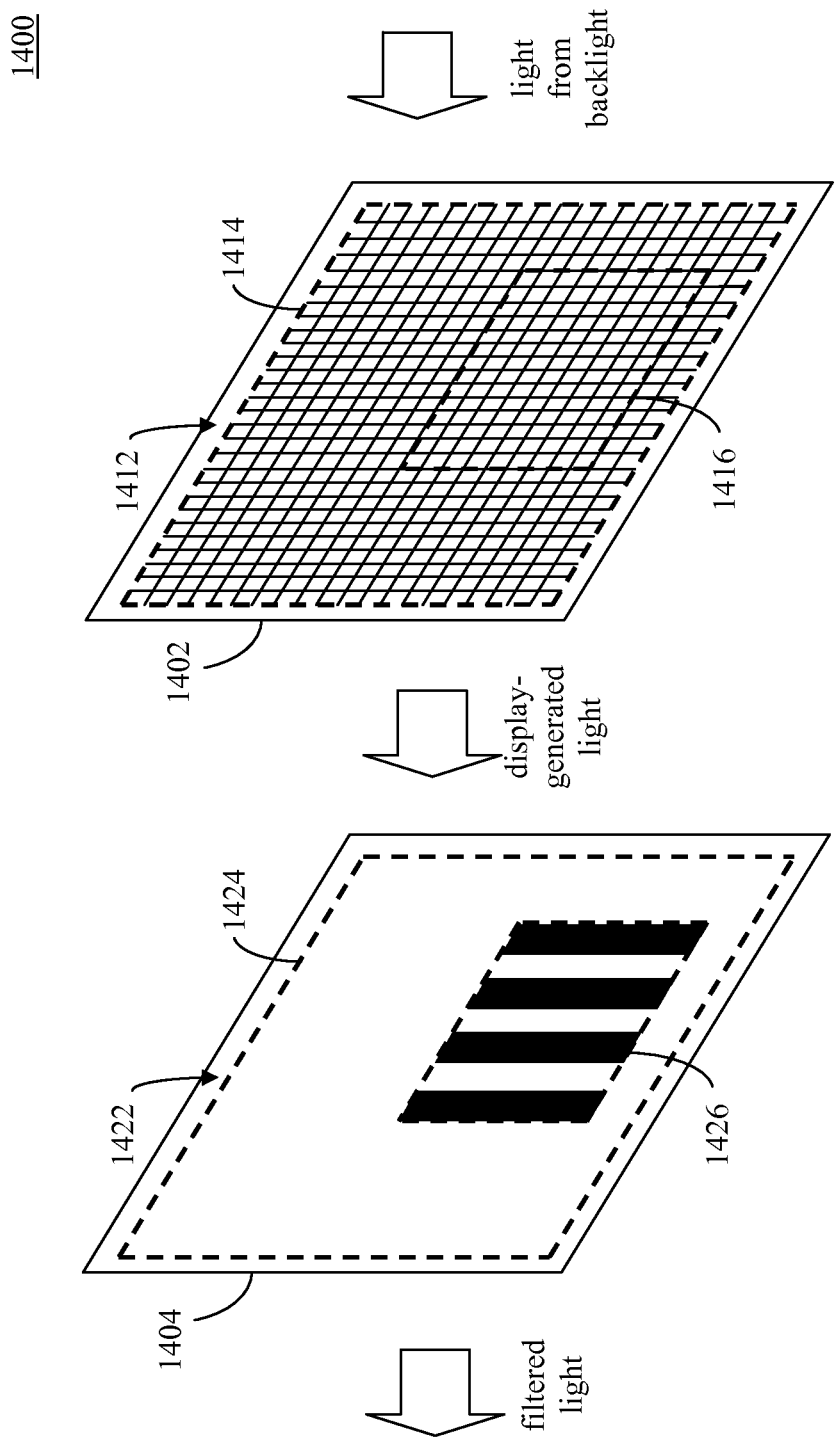

FIG. 14 provides an exploded view of an exemplary display system that implements a regional brightness control scheme based on pixel intensity in accordance with an embodiment.

Figure 15:
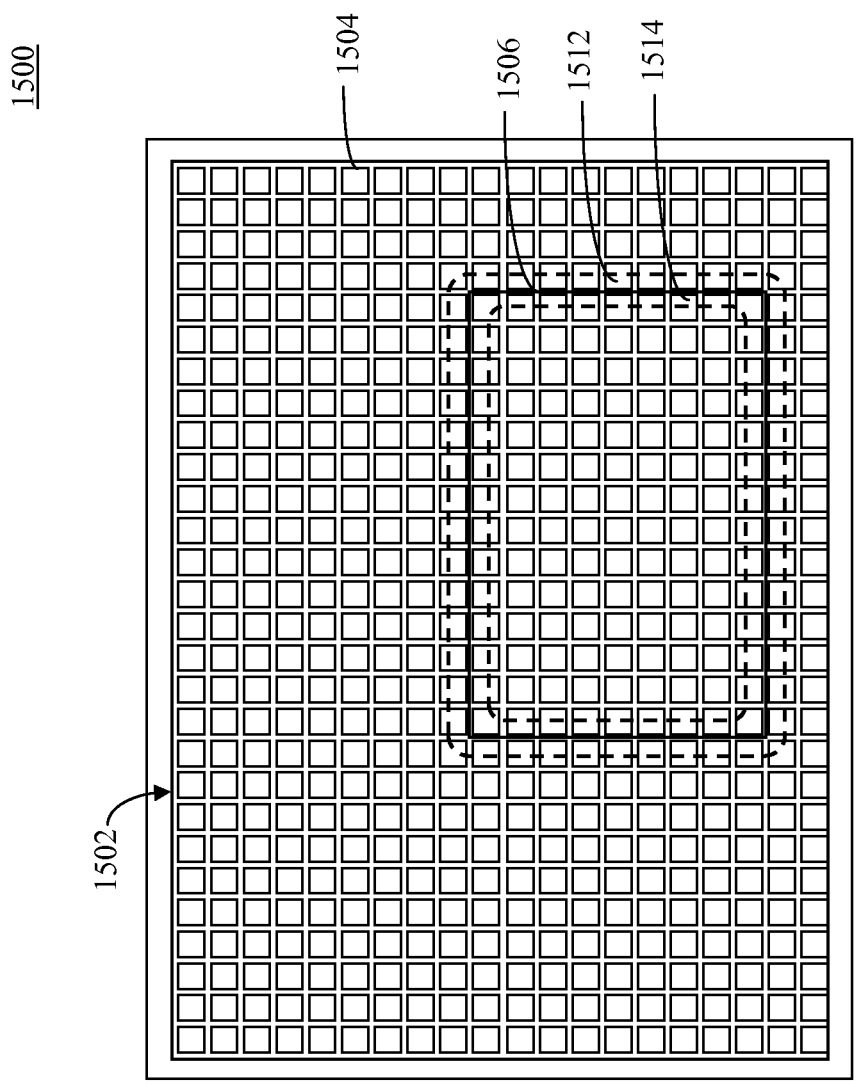

FIG. 15 illustrates a front perspective view of an exemplary display panel of a display system in accordance with an embodiment.

Figure 16:
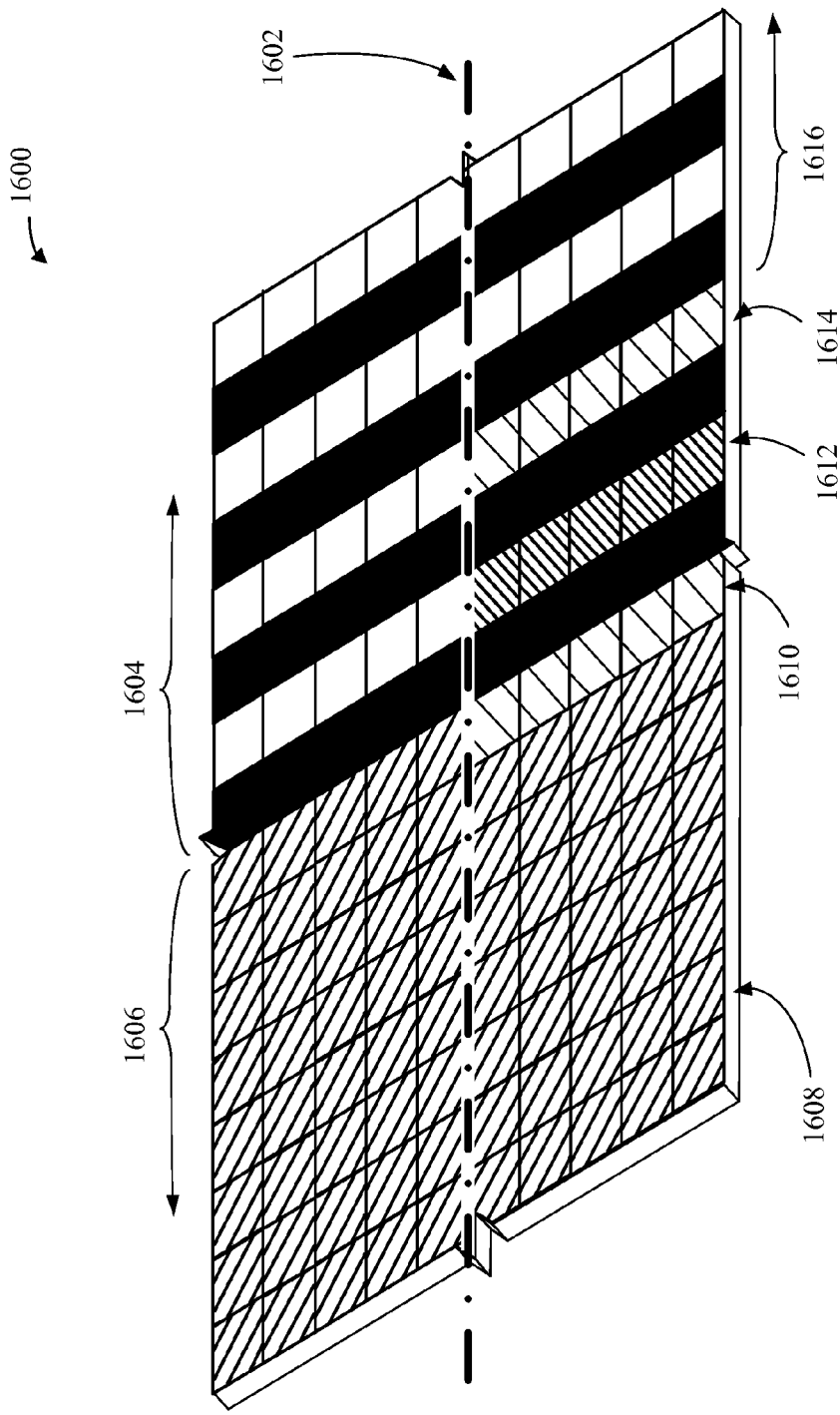

FIG. 16 illustrates two exemplary configurations of an adaptable light manipulator that includes a parallax barrier and a brightness regulation overlay in accordance with an embodiment.

Figure 17A:
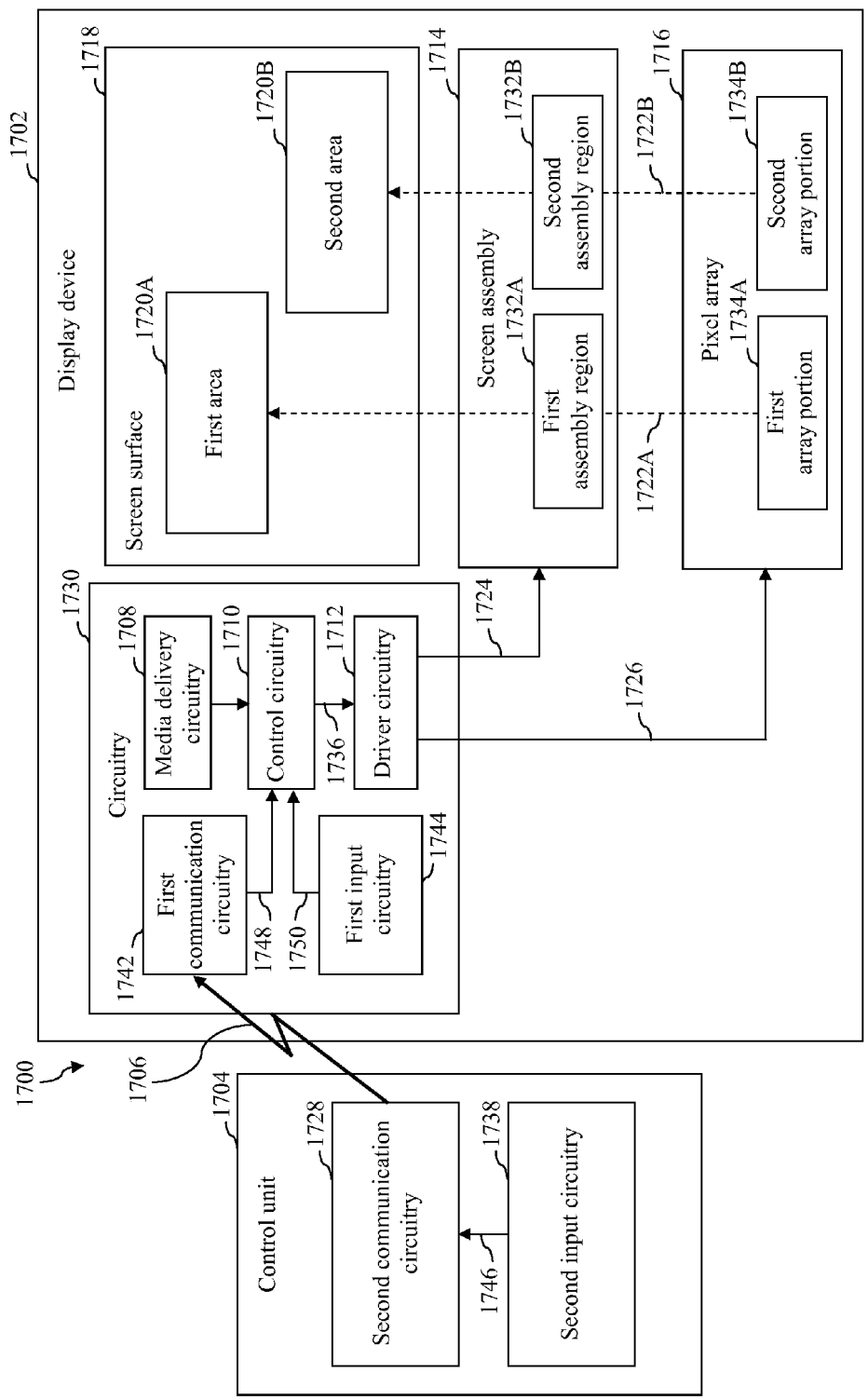
Figure 19:
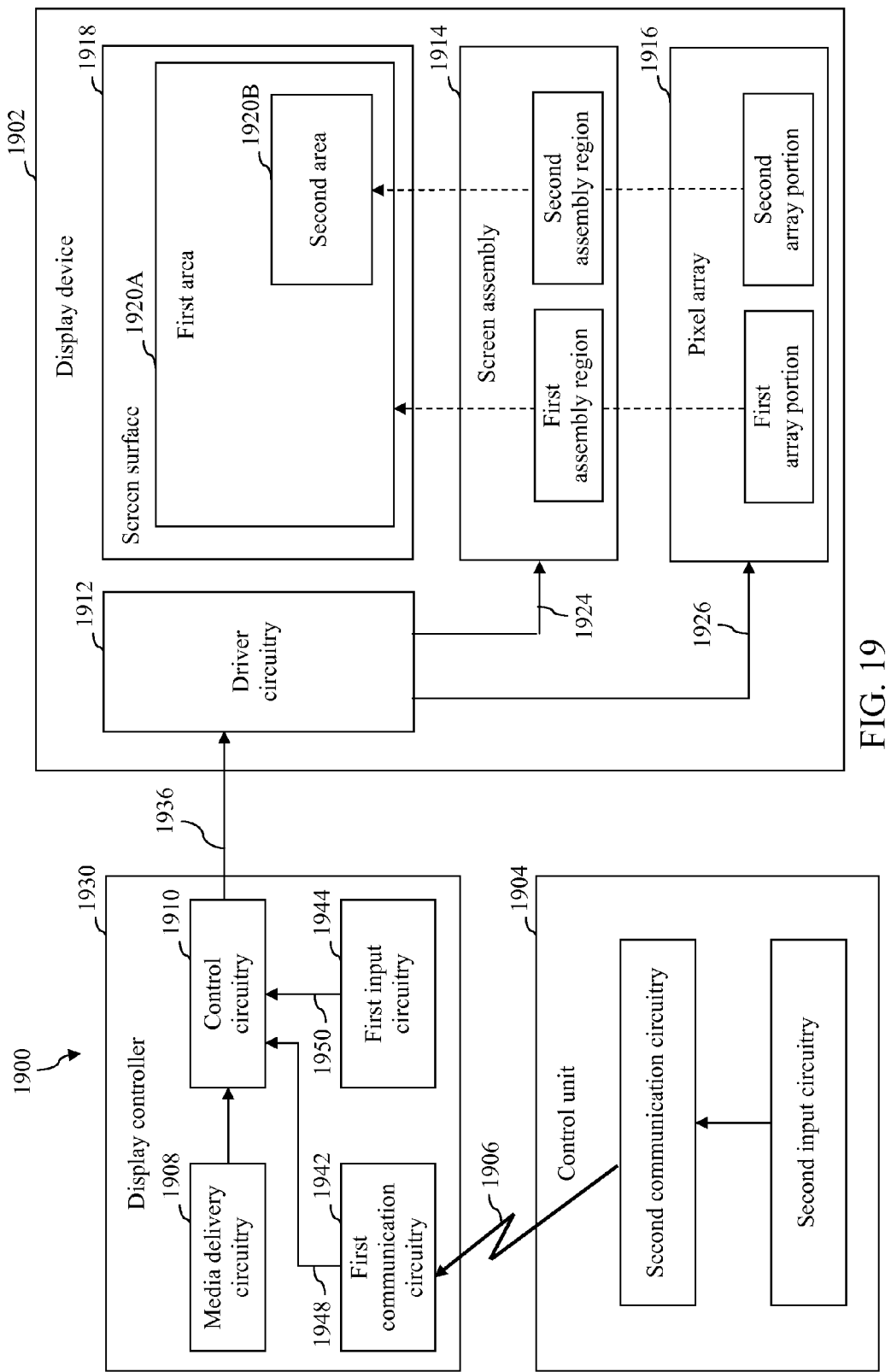

FIGS. 17A and 19 are block diagrams of exemplary display systems in accordance with embodiments that support user controlled regional display of mixed two and three dimensional content.

FIGS. 17B and 17C show alternative arrangements of elements of a display system shown in FIG. 17A in accordance with embodiments.

Figure 18:
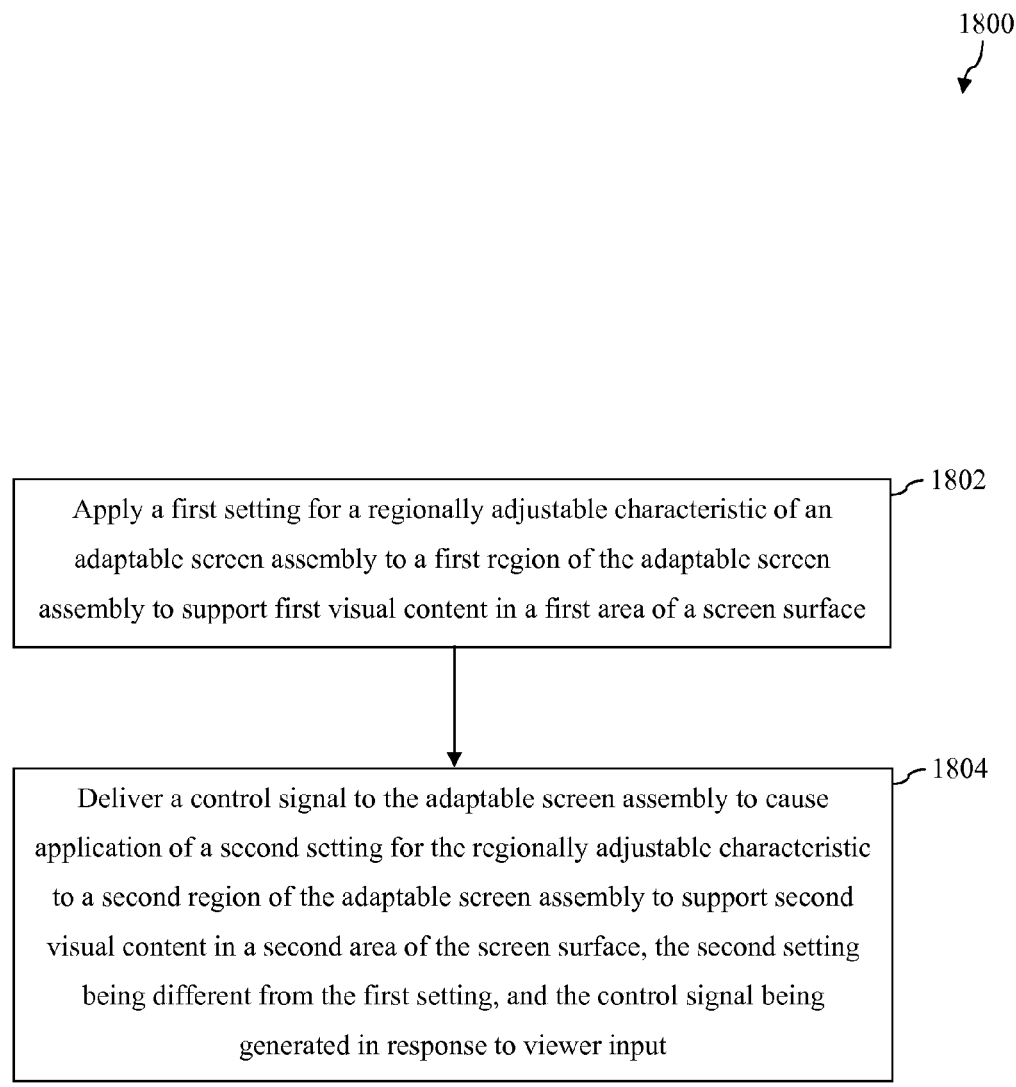
Figure 21:
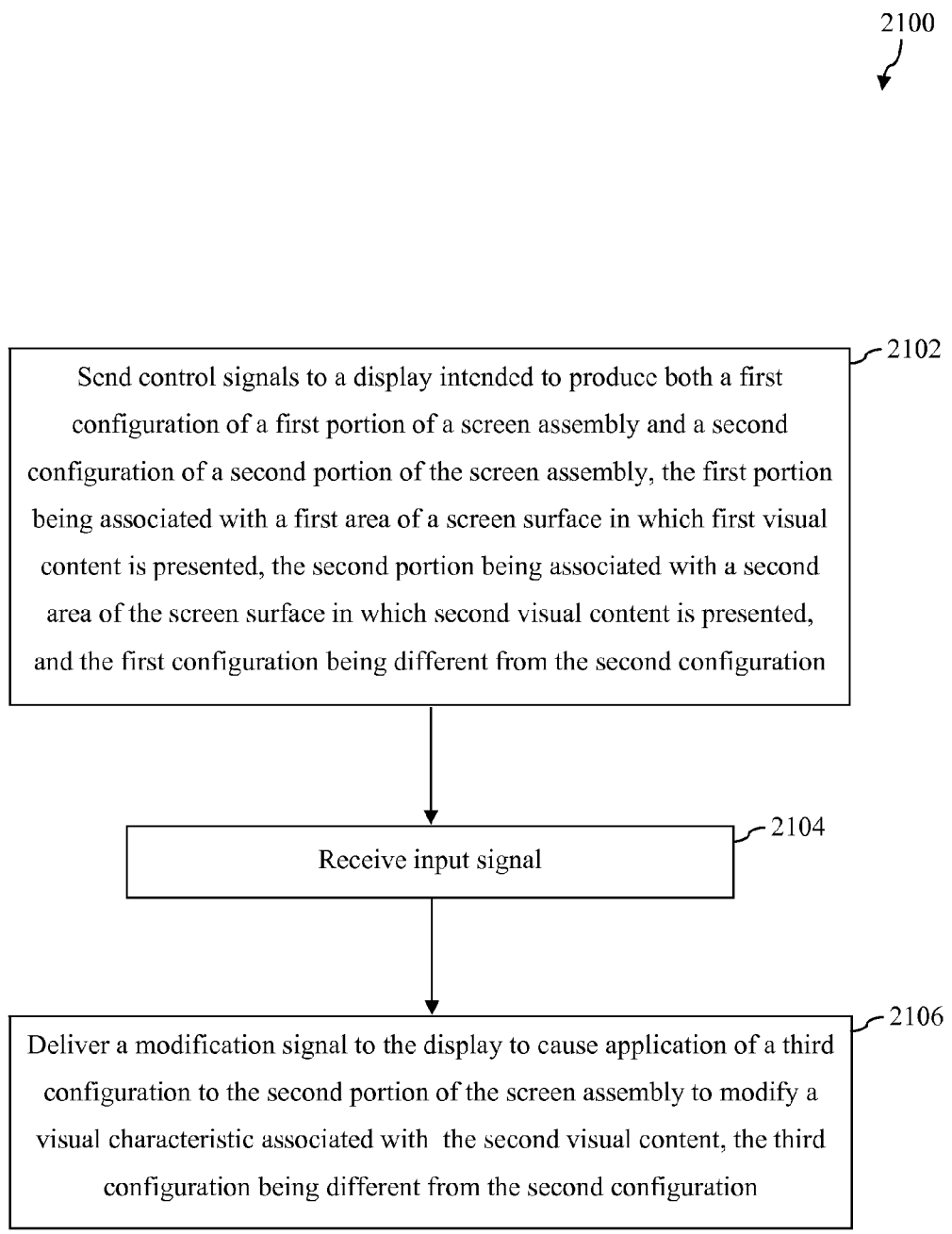
Figure 22:
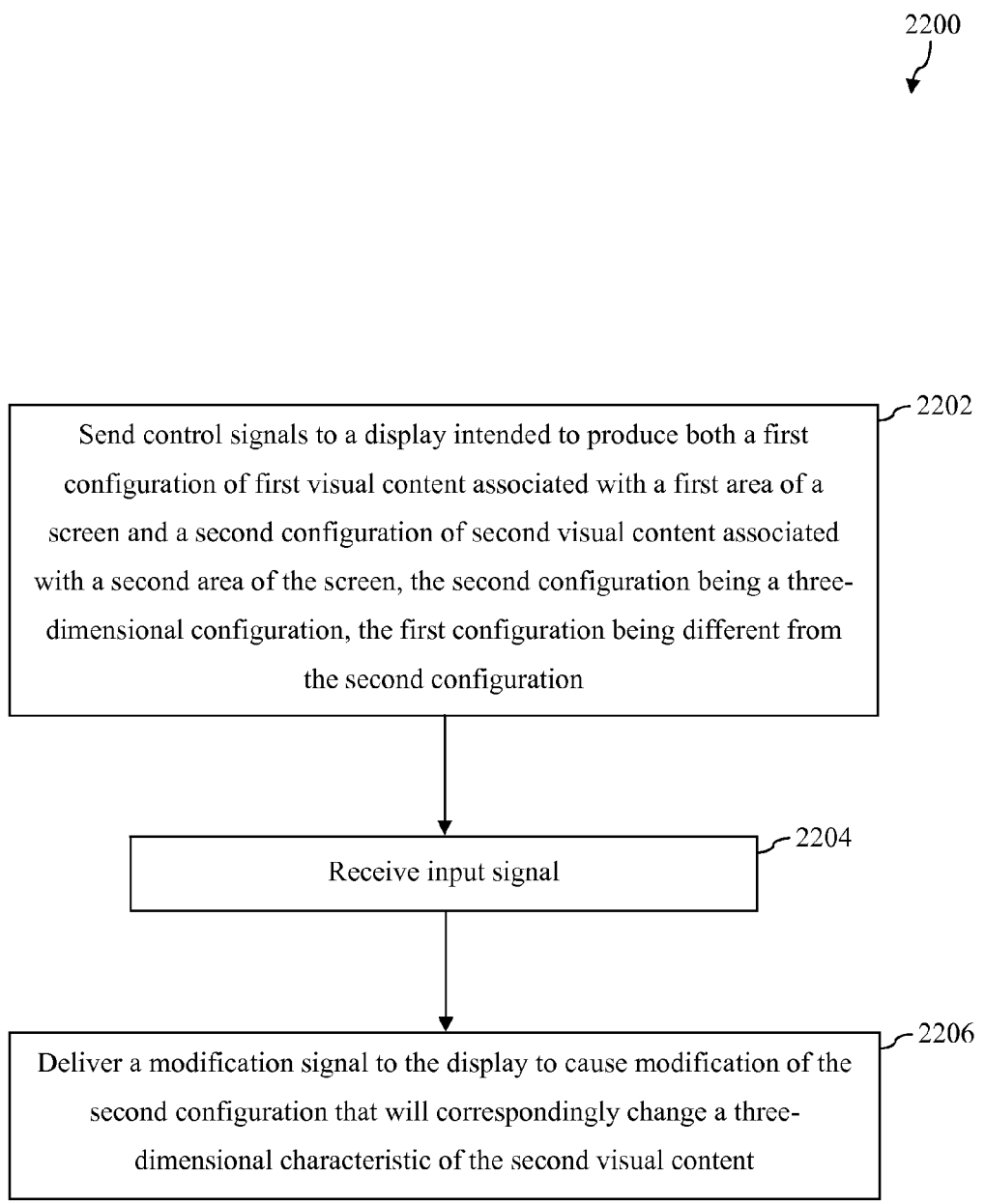

FIGS. 18, 21, and 22 depict flowcharts of exemplary methods for supporting user controlled regional display of mixed two and three dimensional content in accordance with embodiments.

Figure 20:
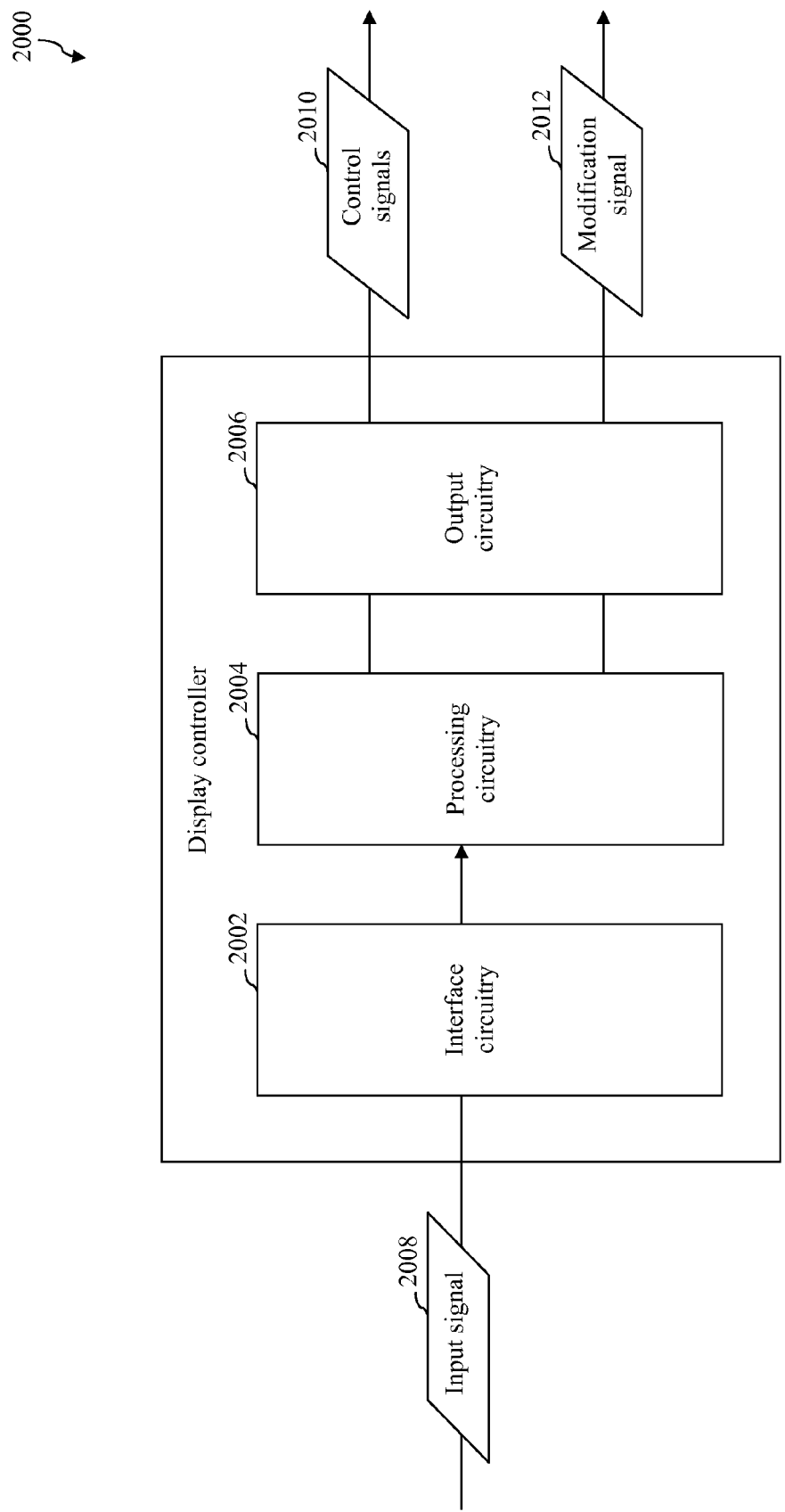

FIG. 20 is an exemplary implementation of a display controller shown in FIG. 19 in accordance with an embodiment.

Figure 23:
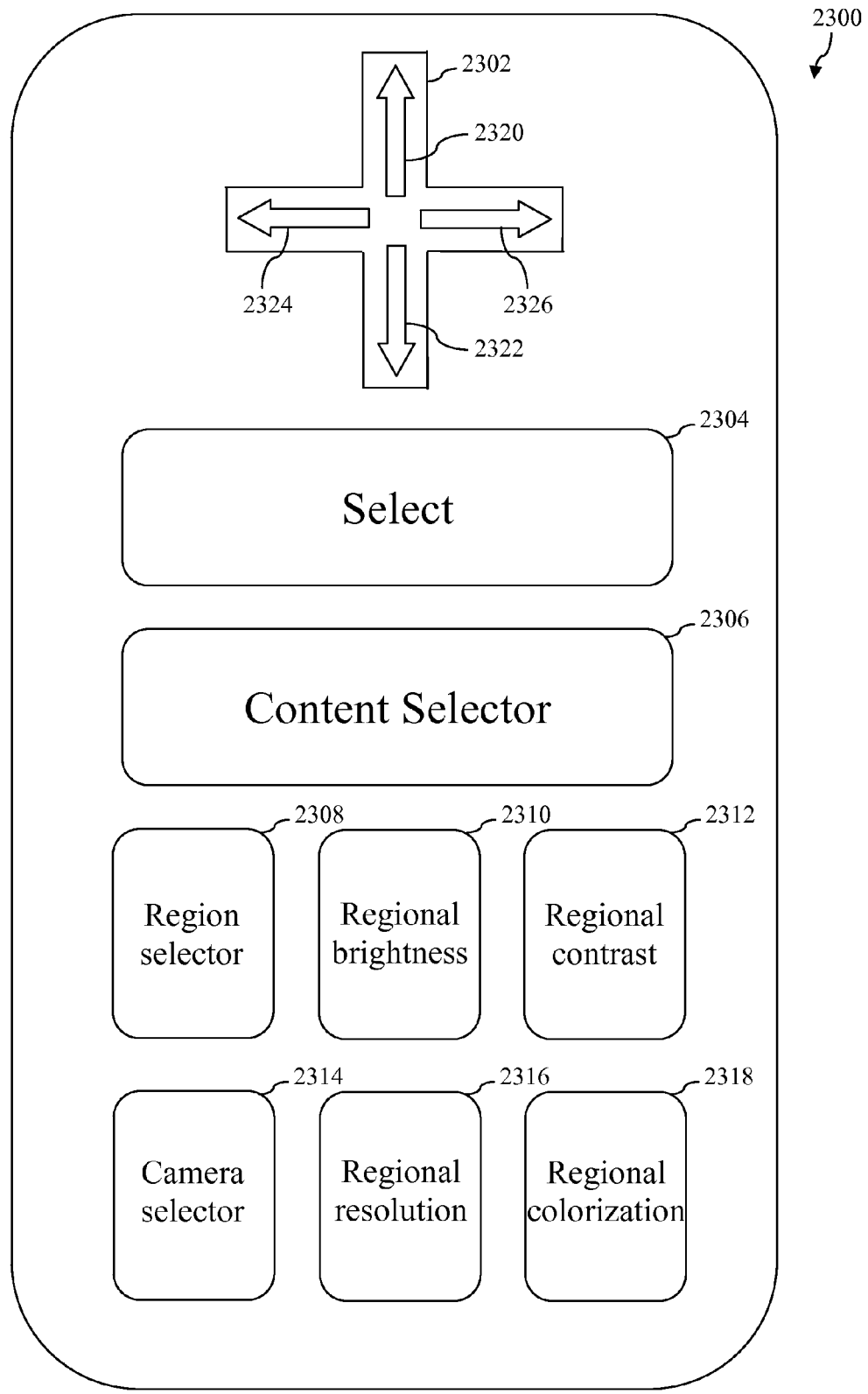

FIG. 23 is an exemplary implementation of a control unit shown in FIG. 17 or 19 in accordance with an embodiment.

Figure 24:
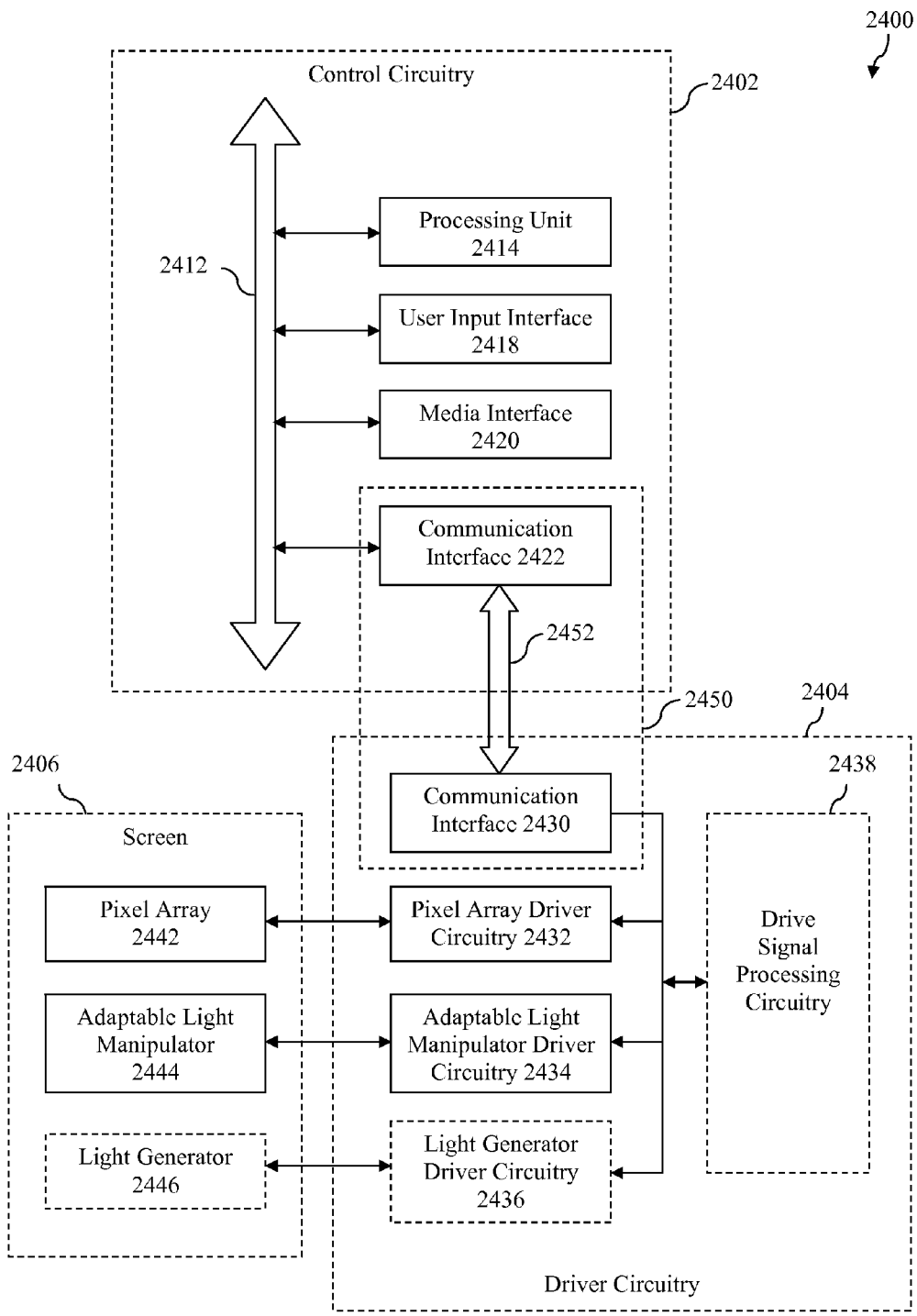

FIG. 24 is a block diagram of an exemplary practical implementation of an adaptable two-dimensional/three-dimensional display system in accordance with an embodiment of the present invention.

Figure 25:
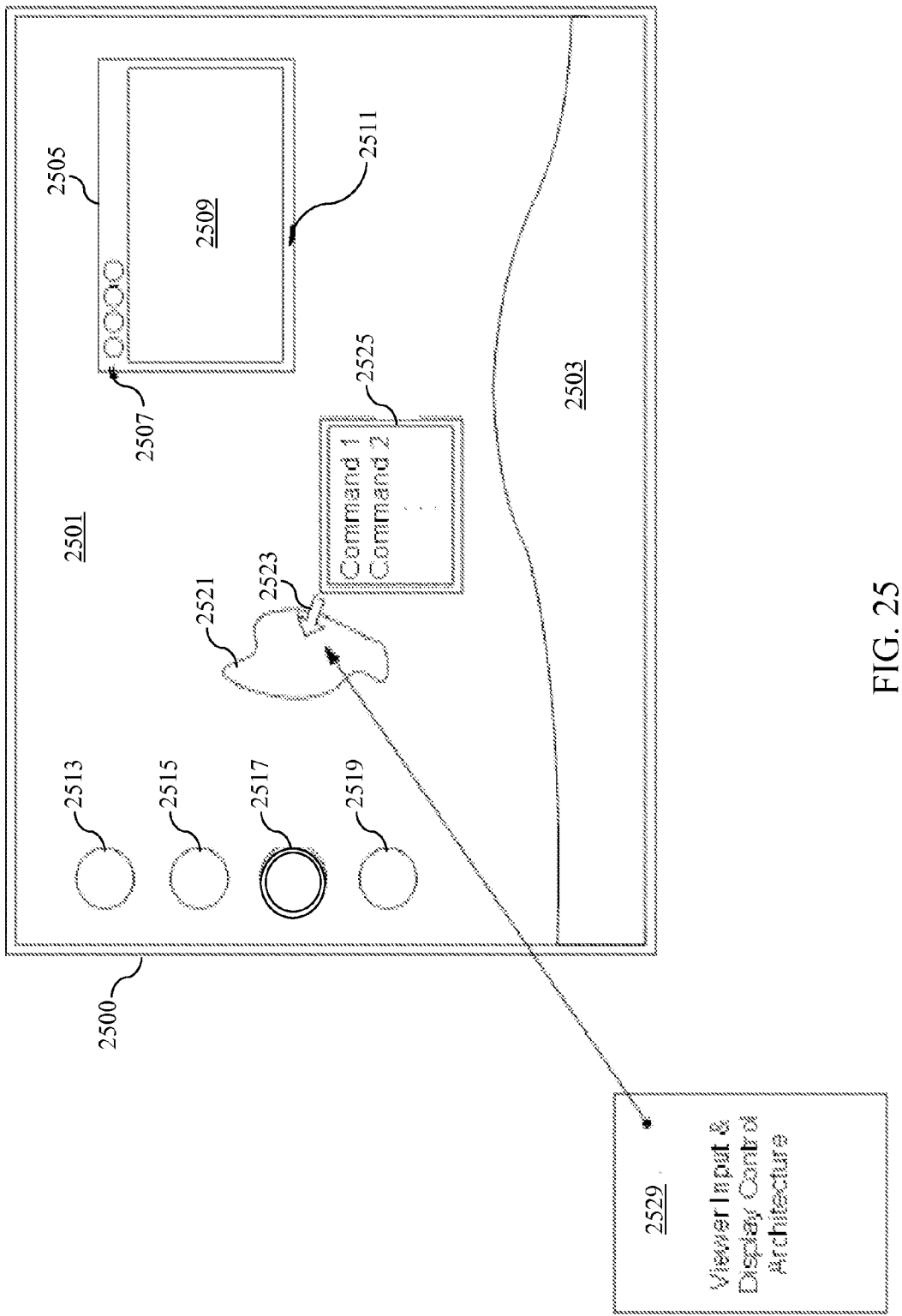

FIG. 25 depicts a desktop (e.g., a screen surface) that includes a variety of areas in which respective instances of content may be presented in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Embodiments described herein provide systems and methods for supporting user controlled regional display of mixed two and three dimensional content. Two-dimensional (2D) content is content that is configured to be perceived as one or more two-dimensional images. Three-dimensional (3D) content is content that is configured to be perceived as one or more three-dimensional images. The mixed two and three dimensional content is displayed to a user among regions of a screen by driving a pixel array and a screen assembly in a coordinated fashion based on settings of a regionally controlled characteristic of the screen assembly. Some exemplary techniques for driving a pixel array and a screen assembly in a coordinated fashion are described in commonly-owned co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein.

The screen assembly may include a non-uniform light generator and/or an adaptable light manipulator, for example. The adaptable light manipulator may comprise, for example, an adaptable parallax barrier such as that described in commonly-owned co-pending U.S. patent application Ser. No. 12/845,440, filed on Jul. 28, 2010, and entitled "Adaptable Parallax Barrier Supporting Mixed 2D and Stereoscopic 3D Display Regions," the entirety of which is incorporated by reference herein. As described in this application, the adaptable light manipulator can be dynamically modified in order to accommodate, for example, a changing setting of a regionally adjustable characteristic of the screen assembly with respect to a designated region of the screen.

As further described in commonly-owned, co-pending U.S. patent application Ser. No. 12/774,225, filed on May 5, 2010 and entitled "Controlling a Pixel Array to Support an Adaptable Light Manipulator," the entirety of which is incorporated by reference herein, the manner in which images are rendered to pixels of a pixel array used in conjunction with such an adaptable light manipulator may be coordinated with the state of the adaptable light manipulator to support a variety of viewing configurations.

As described in the aforementioned, incorporated U.S. patent application Ser. No. 12/845,440, in a case in which the adaptable light manipulator is an adaptable parallax barrier, simultaneous presentation of two-dimensional and three-dimensional content (and/or various instances of three-dimensional content representing differing numbers of perspectives) via different regions of the same display is also enabled. This feature may be supported by a non-uniform light generator (such as a backlighting array) as described in commonly-owned, co-pending U.S. patent application Ser. No. 12/982,020, filed on even date herewith and entitled "Backlighting Array Supporting Adaptable Parallax Barrier", the entirety of which is incorporated by reference herein.

II. Exemplary Display Systems that Support Multiple Viewing Configurations

Before describing example systems and methods for supporting user controlled regional display of mixed two and three dimensional content, exemplary display systems will first be described that include display elements, such as an adaptable light manipulator, a non-uniform light generator, and a pixel array, to enable multiple two-dimensional (2D) and/or three-dimensional (3D) viewing configurations. A two-dimensional configuration is used to display a 2D representation of video content. A three-dimensional configuration is used to display a 3D representation of video content. A three-dimensional configuration may include any number of viewpoints (a.k.a. perspectives), two of which may be combined to provide a three-dimensional viewing experience. For instance, a three-dimensional configuration that includes n viewpoints is said to be a 3Dn configuration, where n is a positive integer greater than or equal to two. The configurations that are used to display the different video contents may be different or the same.

Figure 1:
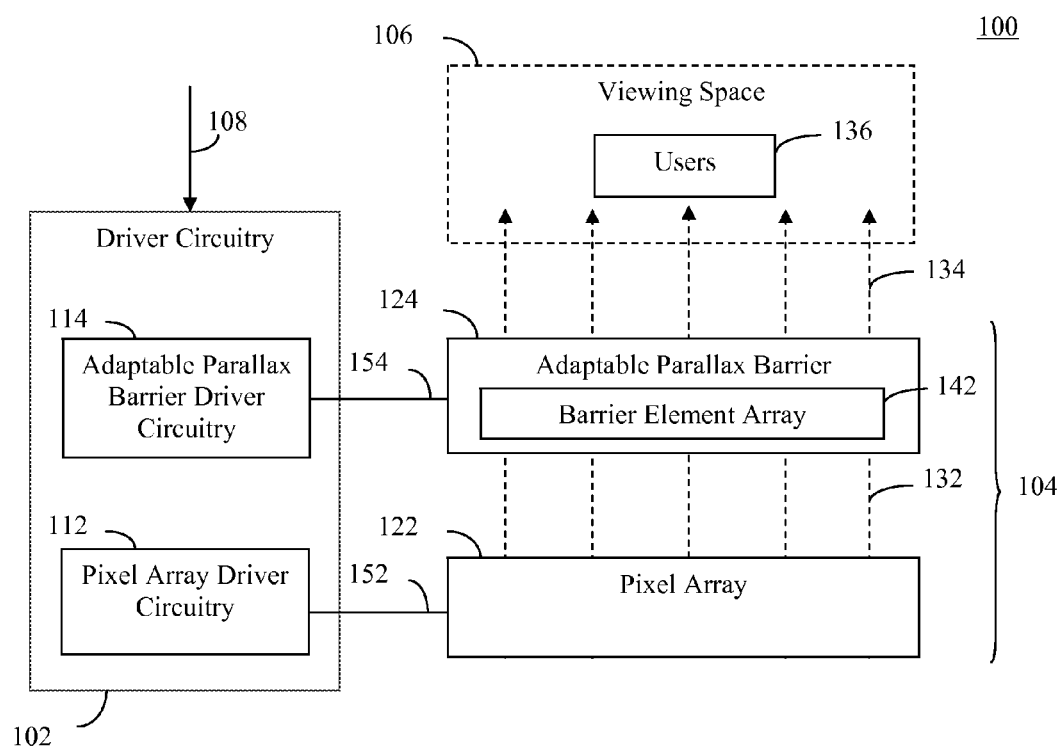
FIG. 1 is a block diagram of an exemplary display system in accordance with an embodiment that utilizes an adaptable parallax barrier to support multiple viewing configurations.

FIG. 1 is a block diagram of an exemplary display system 100 that utilizes an adaptable parallax barrier to support multiple viewing configurations in accordance with an embodiment. As shown in FIG. 1, display system 100 includes driver circuitry 102 and a screen 104, wherein screen 104 include a pixel array 122 and an adaptable parallax barrier 124. As further shown in FIG. 1, driver circuitry 104 includes pixel array driver circuitry 112 and adaptable parallax barrier driver circuitry 114.

Pixel array 122 comprises a two-dimensional array of pixels (e.g., arranged as a grid or other distribution). Pixel array 122 is a self-illuminating or light-generating pixel array such that the pixels of pixel array 122 each emit light included in light 132. Each pixel may be a separately addressable light source (e.g., a pixel of a plasma display, an LCD display, an LED display such as an OLED display, or of other type of display). Each pixel of pixel array 122 may be individually controllable to vary color and intensity. In an embodiment, each pixel of pixel array 122 may include a plurality of sub-pixels that correspond to separate color channels, such as a trio of red, green, and blue sub-pixels included in each pixel.

Adaptable parallax barrier 124 is positioned proximate to a surface of pixel array 122. Barrier element array 142 is a layer of adaptable parallax barrier 124 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 142 may be configured such that light 132 emanating from pixel array 122 is filtered to produce filtered light 134, wherein filtered light 134 includes one or more two-dimensional and/or three-dimensional images that may be viewed by users 136 in a viewing space 106.

Depending upon the implementation, each barrier element may have a round, square, or rectangular shape, and barrier element array 142 may have any number of rows of barrier elements that extend a vertical length of barrier element array 142. In another embodiment, each barrier element may have a "band" shape that extends a vertical length of barrier element array 142, such that barrier element array 142 includes a single horizontal row of barrier elements. Each barrier element may include one or more of such bands, and different regions of barrier element array 142 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 102 receives control signals 108 from control circuitry (not shown in FIG. 1). The control signals 108 cause driver circuitry 102 to place screen 104 in a selected one of a plurality of different viewing configurations. In particular, based on control signals 108, adaptable parallax barrier driver circuitry 114 transmits drive signals 154 that cause barrier element array 142 to be placed in a state that supports the selected viewing configuration. The selected viewing configuration may be a particular two-dimensional viewing configuration, a particular three-dimensional viewing configuration, or a viewing configuration that supports the display of different types of two-dimensional and/or three-dimensional content in corresponding display regions.

Figure 2:
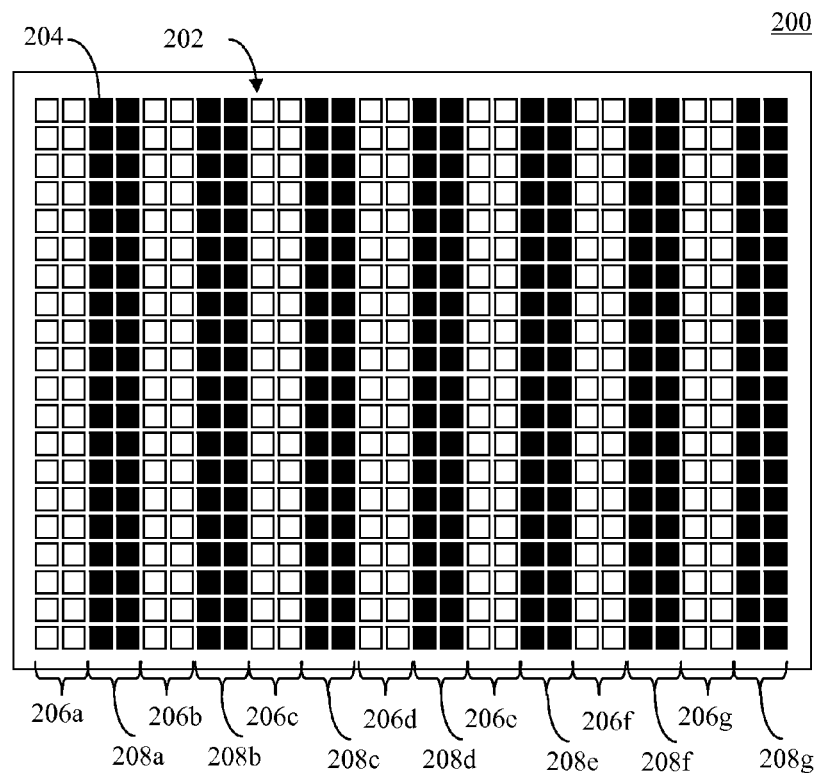
FIG. 2 illustrates an exemplary arrangement of an adaptable parallax barrier in accordance with an embodiment that supports a particular three-dimensional viewing configuration.

For example, FIG. 2 shows an exemplary arrangement of an adaptable parallax barrier 200 that supports a particular three-dimensional viewing configuration. Adaptable parallax barrier 200 is an example of adaptable parallax barrier 124 of FIG. 1. As shown in FIG. 2, adaptable parallax barrier 200 includes a barrier element array 202, which includes a plurality of barrier elements 204 arranged in a two-dimensional array. Furthermore, as shown in FIG. 2, barrier element array 202 includes a plurality of parallel strips of barrier elements 204 that are selected to be non-blocking to form a plurality of parallel non-blocking strips (or "slits") 206a-206g. As shown in FIG. 2, parallel non-blocking strips 206a-206g (non-blocking slits) are alternated with parallel blocking strips 208a-208g of barrier elements 204 that are selected to be blocking. In the example of FIG. 2, non-blocking strips 206a-206g and blocking strips 208a-208g each have a width (along the x-dimension) of two barrier elements 204, and have lengths that extend along the entire y-dimension (twenty barrier elements 204) of barrier element array 202, although in other embodiments, may have alternative dimensions. Non-blocking strips 206a-206g and blocking strips 208a-208g form a parallax barrier configuration for adaptable parallax barrier 200. The spacing (and number) of parallel non-blocking strips 206 in barrier element array 202 may be selectable by choosing any number and combination of particular strips of barrier elements 204 in barrier element array 202 to be non-blocking, to be alternated with blocking strips 208, as desired. For example, hundreds, thousands, or even larger numbers of non-blocking strips 206 and blocking strips 208 may be present in adaptable parallax barrier 200.

Figure 3:
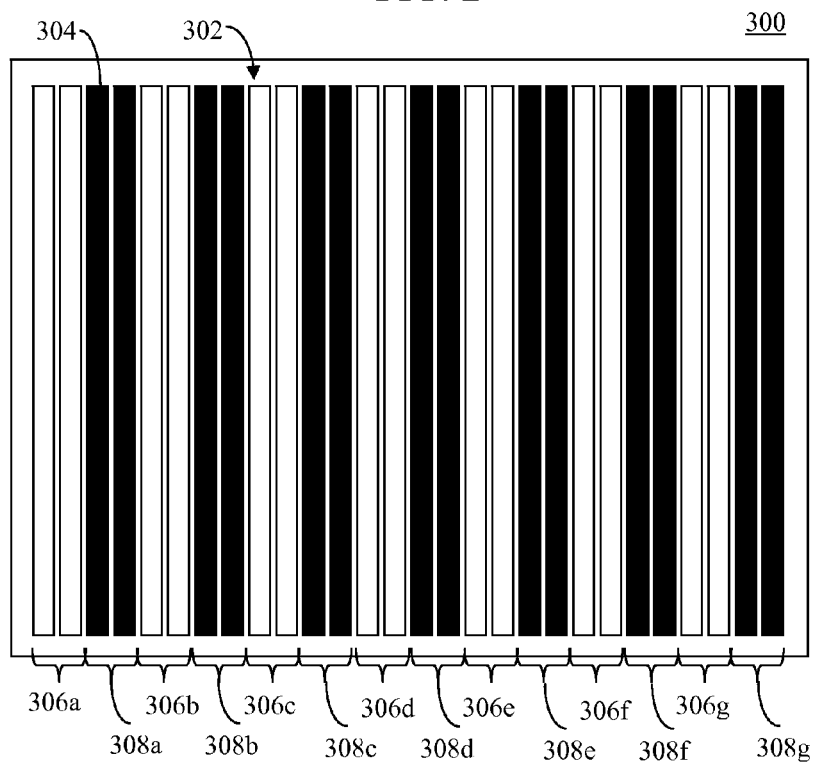
FIG. 3 illustrates an exemplary arrangement of an adaptable parallax barrier in accordance with an alternate embodiment that supports a particular three-dimensional viewing configuration.

FIG. 3 shows an alternative example of an adaptable parallax barrier 300 that has also been configured to support a particular three-dimensional viewing configuration. Similarly to adaptable parallax barrier 200 of FIG. 2, adaptable parallax barrier 300 includes a barrier element array 302, which includes a plurality of barrier elements 304 arranged in a two-dimensional array (28×1 array). Barrier elements 304 have widths (along the x-dimension) similar to the widths of barrier elements 204 in FIG. 2, but have lengths that extend along the entire vertical length (y-dimension) of barrier element array 302. As shown in FIG. 3, barrier element array 302 includes parallel non-blocking strips 306a-306g alternated with parallel blocking strips 308a-308g. In the example of FIG. 3, parallel non-blocking strips 306a-306g and parallel blocking strips 308a-308g each have a width (along the x-dimension) of two barrier elements 304, and have lengths that extend along the entire y-dimension (one barrier element 304) of barrier element array 302.

Each of adaptable parallax barriers 200 and 300, configured in the manner shown in FIGS. 2 and 3 respectively, filter light produced by a pixel array to form one or more three-dimensional views in a viewing space, thus supporting a three-dimensional viewing configuration. To achieve a two-dimensional viewing configuration, all of the barrier elements of either adaptable parallax barrier 200 or 300 can simply be placed in a non-blocking state. Additional details concerning how the adaptable parallax barriers operate to support such three-dimensional viewing may be found, for example, in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions."

In the adaptable parallax barrier configurations shown in FIGS. 2 and 3, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 4:
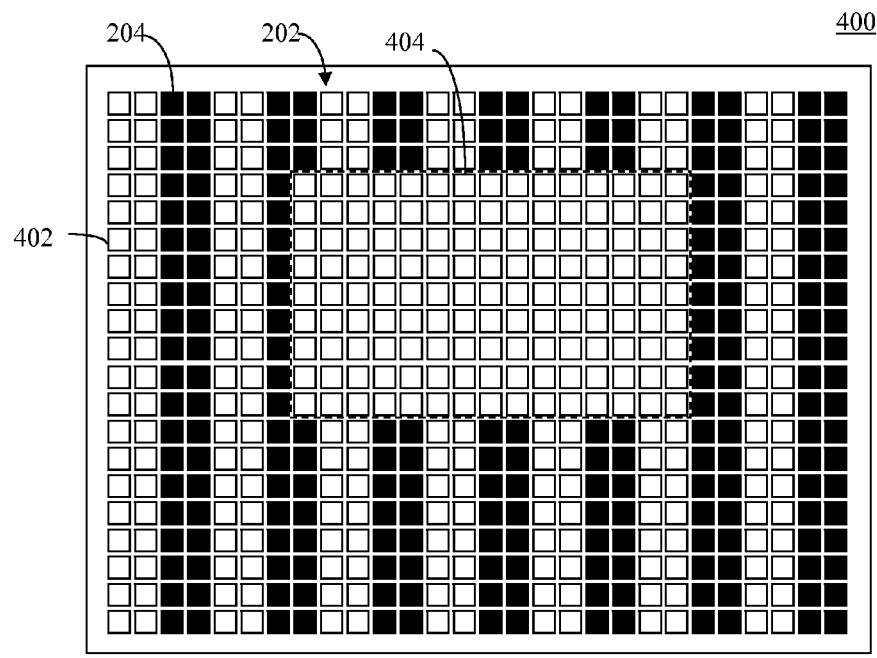
FIG. 4 illustrates an exemplary arrangement of an adaptable parallax barrier in accordance with an embodiment that supports a viewing configuration that mixes two-dimensional and three-dimensional viewing regions.

For instance, FIG. 4 shows an exemplary arrangement of an adaptable parallax barrier 400 that supports a viewing configuration that mixes two-dimensional and three-dimensional viewing regions according to example embodiments. Adaptable parallax barrier 400 is similar to adaptable parallax barrier 200 of FIG. 2, having barrier element array 202 including a plurality of barrier elements 204 arranged in a two-dimensional array. In FIG. 4, a first region 402 of barrier element array 202 includes a plurality of parallel non-blocking strips alternated with parallel blocking strips that together fill first region 402. A second region 404 of barrier element array 202 is surrounded by first region 402. Second region 404 is a rectangular shaped region of barrier element array 202 that includes a two-dimensional array of barrier elements 204 that are non-blocking. Thus, in FIG. 4, barrier element array 202 is configured to enable a three-dimensional image to be generated by pixels of a pixel array that are adjacent to barrier elements of first region 402, and to enable a two-dimensional image to be generated by pixels of the pixel array that are adjacent to barrier elements inside of second region 404. Note that alternatively, first region 402 may include all non-blocking barrier elements 202 to pass a two-dimensional image, and second region 404 may include parallel non-blocking strips alternated with parallel blocking strips to pass a three-dimensional image. In further embodiments, adaptable parallax barrier 400 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 5:
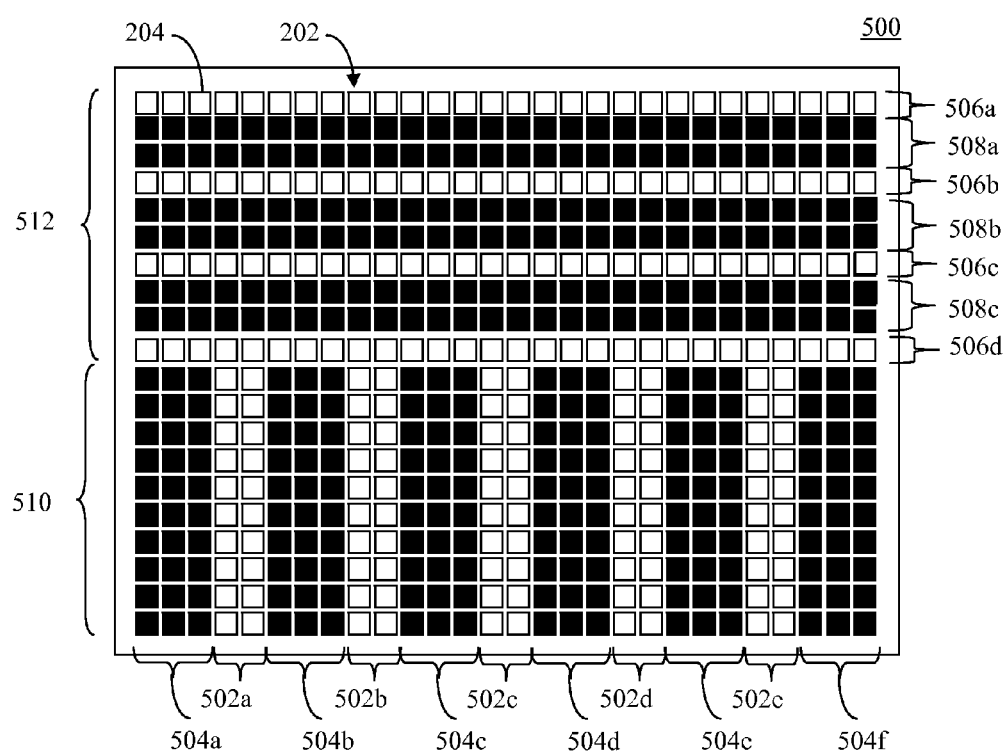
FIG. 5 illustrates an exemplary arrangement of an adaptable parallax barrier in accordance with an embodiment in which different orientations of transparent and opaque slits are used to simultaneously support different viewer orientations.

For example, FIG. 5 shows an exemplary arrangement of an adaptable parallax barrier 500 in which transparent slits have different orientations, according to an example embodiment. Adaptable parallax barrier 500 is similar to adaptable parallax barrier 200 of FIG. 2, having barrier element array 202 including a plurality of barrier elements 204 arranged in a two-dimensional array. A first region 510 (e.g., a bottom half) of barrier element array 202 includes a first plurality of parallel strips of barrier elements 204 that are selected to be non-blocking to form a first plurality of parallel non-blocking strips 502a-502e (each having a width of two barrier elements 204). As shown in FIG. 5, parallel non-blocking strips 502a-502e are alternated with parallel blocking strips 504a-504f of barrier elements 204 (each having a width of three barrier elements 204). Parallel non-blocking strips 502a-502e are oriented in a first direction (e.g., along a vertical axis).

Furthermore, as shown in FIG. 5, a second region 512 (e.g., a top half) of barrier element array 202 includes a second plurality of parallel strips of barrier elements 204 that are selected to be non-blocking to form a second plurality of parallel non-blocking strips 506a-506d (each having a width of one barrier element 204). As shown in FIG. 5, parallel non-blocking strips 506a-506d are alternated with parallel blocking strips 508a-508c of barrier elements 204 (each having a width of two barrier elements 204). Parallel non-blocking strips 506a-506d are oriented in a second direction (e.g., along a horizontal axis).

As such, in FIG. 5, first and second pluralities of parallel non-blocking strips 502a-502e and 506a-506d are present in barrier element array 202 that are oriented perpendicularly to each other. The region of barrier element array 202 that includes first plurality of parallel non-blocking strips 502a-502e may be configured to deliver a three-dimensional image in a viewing space to be viewable by a user whose body is oriented vertically (e.g., sitting upright or standing up). The region of barrier element array 202 that includes second plurality of parallel non-blocking strips 506a-506d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

The foregoing adaptable parallax barriers and arrangements thereof have been described herein by way of example only. Additional adaptable parallax barriers and arrangements thereof may be used to support additional viewing configurations. For example, additional adaptable parallax barrier implementations and arrangements thereof are described in the aforementioned, incorporated U.S. patent application Ser. No. 12/845,440 filed on Jul. 28, 2010, and entitled "Adaptable Parallax Barrier Supporting Mixed 2D and Stereoscopic 3D Display Regions," and in commonly-owned, co-pending U.S. patent application Ser. No. 12/845,461, filed on Jul. 28, 2010, and entitled "Display Supporting Multiple Simultaneous 3D Views," the entirety of which is incorporated by reference herein.

Returning now to the description of display system 100 of FIG. 1, since a configuration of adaptable parallax barrier 124 can be dynamically modified to support a particular viewing configuration, pixel array 122 must also be controlled to support the same viewing configuration. In particular, the rendering of pixels of an image (also referred to herein as "image pixels") among the pixels of pixel array 122 (also referred to herein as "display pixels") must be handled in a manner that is consistent with a current configuration of adaptable parallax barrier 124. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 124. Such changes may be implemented by a controller (not shown in FIG. 1) via delivery of appropriate control signals 108 to pixel array driver circuitry 112.

For example, in one embodiment, when a configuration of adaptable parallax barrier 124 supports a first viewing configuration responsive to control signals 108, pixel array driver circuitry 204 sends drive signals 152 in conformance with control signals 108 such that the rendering of images to pixel array 122 occurs in a manner that also supports the first viewing configuration. Furthermore, when the configuration of adaptable parallax barrier 124 is modified to support a second viewing configuration responsive to control signals 108, pixel array driver circuitry 204 sends drive signals 152 in conformance with the control signals 108 such that the rendering of images to pixel array 122 occurs in a manner that also supports the second viewing configuration.

Figure 6:
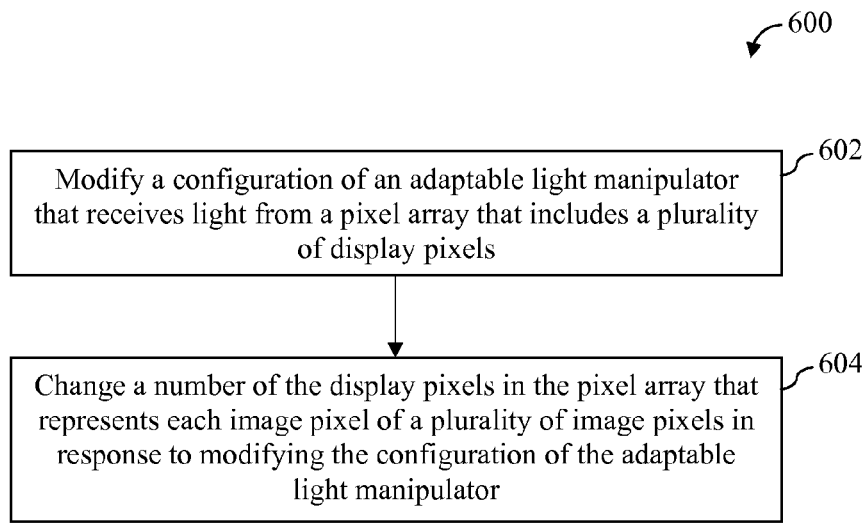
FIG. 6 depicts a flowchart of an exemplary method for controlling a pixel array to support a same viewing configuration as an adaptable light manipulator in accordance with an embodiment.

FIG. 6 depicts a flowchart 600 of an exemplary method for controlling a pixel array to support the same viewing configuration as an adaptable light manipulator (such as adaptable parallax barrier 124) in accordance with an embodiment. As shown in FIG. 6, the method of flowchart 600 begins at step 602. During step 602, a configuration of an adaptable light manipulator, such as adaptable parallax barrier 124, is modified. At step 604, a number of display pixels in a pixel array, such as pixel array 122, that represents each image pixel of a plurality of image pixels is changed in response to modifying the configuration of the adaptable light manipulator.

Figure 8:
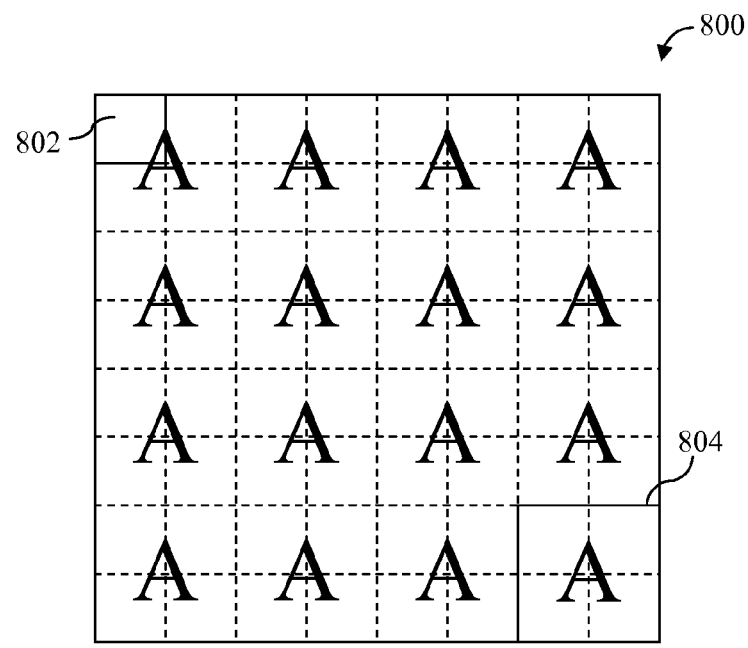
FIG. 8 illustrates a portion of a pixel array to which image pixels have been mapped to support a two-dimensional viewing configuration of an adaptable light manipulator in accordance with an embodiment.
Figure 9:
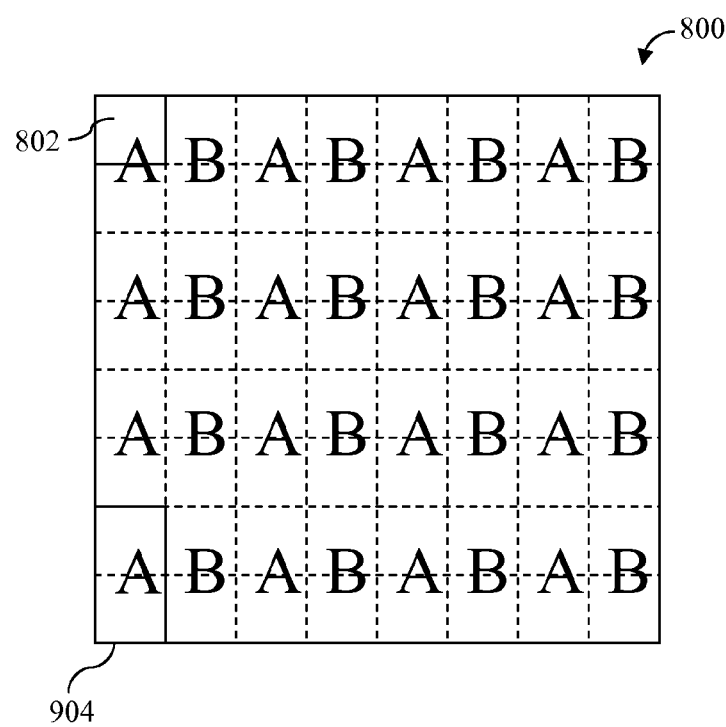
FIG. 9 illustrates how image pixels are mapped to the portion of the pixel array shown in FIG. 8 to support a first three-dimensional viewing configuration of an adaptable light manipulator in accordance with an embodiment.

FIGS. 8 and 9 provide a simple illustration of an exemplary application of the method of flowchart 600. As shown in FIG. 8, a portion of a pixel array 800 includes a 16×16 array of display pixels. An example display pixel is shown as display pixel 802. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 804. In FIG. 8, the first image is intended to represent an image that is viewed when an adaptable light manipulator disposed proximate to the pixel array is configured to support a two-dimensional viewing configuration.

FIG. 9 is intended to represent the same portion of pixel array 800 after the configuration of the adaptable light manipulator has been changed to support a three-dimensional viewing configuration. The three-dimensional viewing configuration requires the combined display of a first image and a second image across the same portion of pixel array 800. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 7:
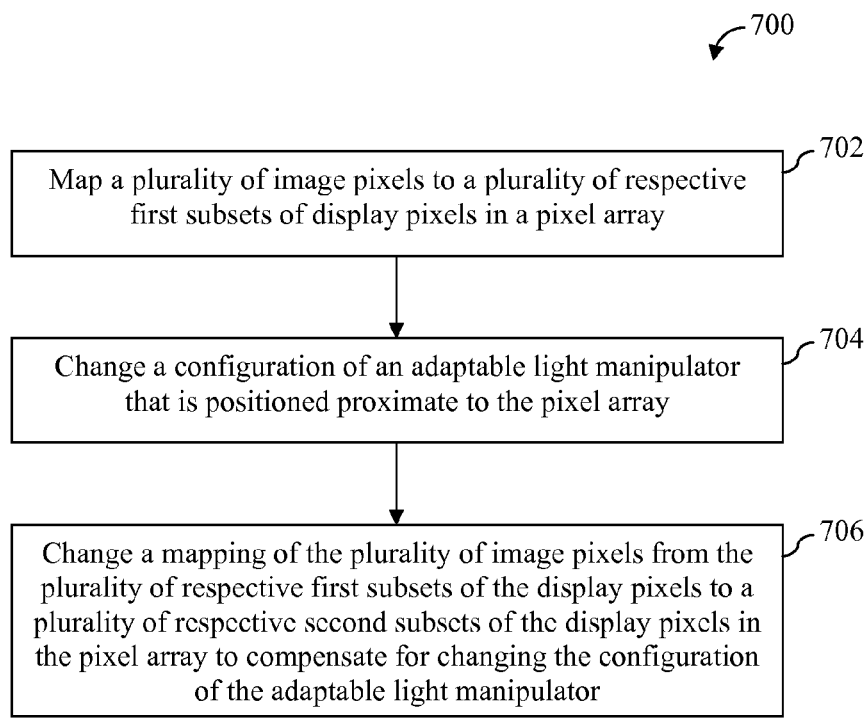
FIG. 7 depicts a flowchart of an alternate exemplary method for controlling a pixel array to support a same viewing configuration as an adaptable light manipulator in accordance with an embodiment.

FIG. 7 depicts a flowchart 700 of another exemplary method for controlling a pixel array to support the same viewing configuration as an adaptable light manipulator (such as adaptable parallax barrier 124) in accordance with an embodiment. As shown in FIG. 7, the method of flowchart 700 begins at step 702. During step 702, a plurality of image pixels is mapped to a plurality of respective first subsets of display pixels in a pixel array, such as pixel array 122. At step 704, a configuration of an adaptable light manipulator that is positioned proximate to the pixel array is changed. For example, in an embodiment in which the adaptable light manipulator includes adaptable parallax barrier 124, a slit pattern, orientation, or the like, of adaptable parallax barrier 124 may be changed. At step 706, a mapping of the plurality of image pixels is changed from the plurality of respective first subsets of the display pixels to a plurality of respective second subsets of the display pixels in the pixel array to compensate for changing the configuration of the adaptable light manipulator.

Figure 10:
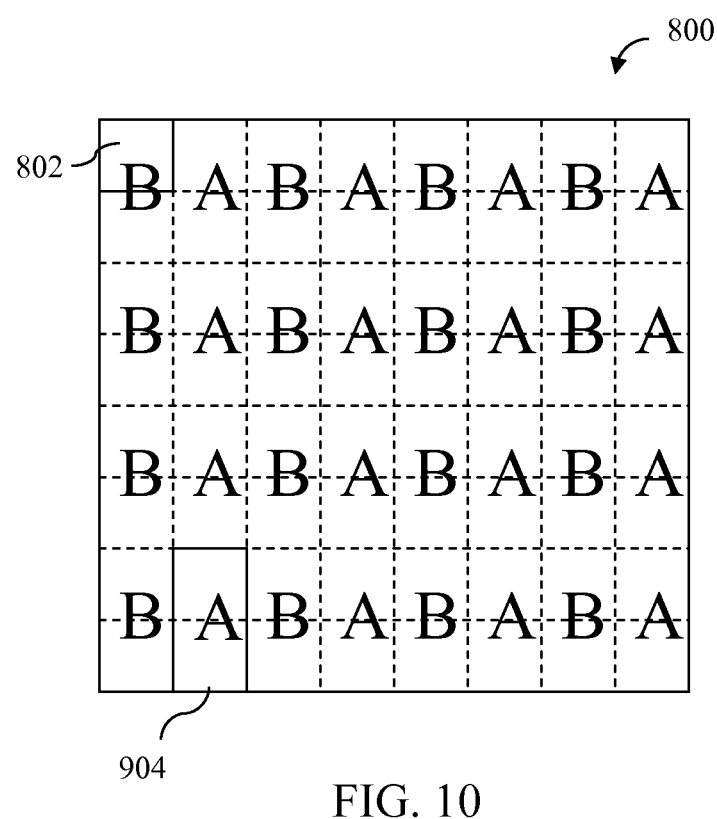
FIG. 10 illustrates how image pixels are mapped to the portion of the pixel array shown in FIGS. 8 and 9 to support a second three-dimensional viewing configuration of an adaptable light manipulator in accordance with an embodiment.

FIGS. 9 and 10 provide a simple illustration of an exemplary application of the method of flowchart 700. As shown in FIG. 9, a portion of a pixel array 800 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 10 is intended to represent the same portion of pixel array 800 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 10. Thus, for example, rather than rendering image pixel 904 to the bottom-most two display pixels in the far-left column of array portion 800, the same image pixel 904 is now rendered to the bottom-most two display pixels in the second column from the left of array portion 800.

Numerous other methods may be used to control the rendering of image pixels to display pixels in support of a desired two-dimensional and/or three-dimensional viewing configuration implemented by an adaptable parallax barrier or other adaptable light manipulator. Additional details concerning such control of a pixel array may be found in the aforementioned, incorporated U.S. patent application Ser. No. 12/774,225, filed on May 5, 2010, and entitled "Controlling a Pixel Array to Support an Adaptable Light Manipulator."

Figure 11:
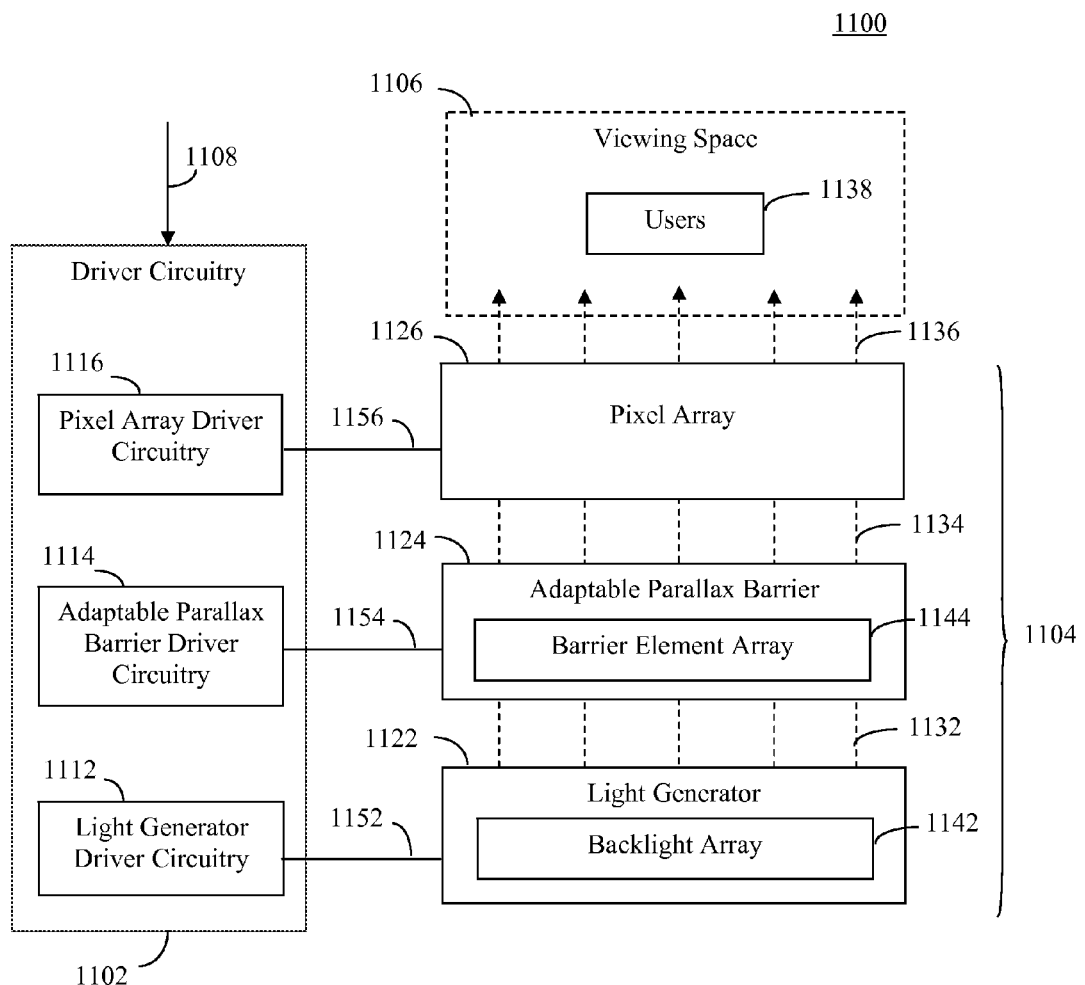
FIG. 11 is a block diagram of an exemplary display system that utilizes an adaptable parallax barrier and a light generator to support multiple viewing configurations in accordance with an embodiment.

FIG. 11 shows a block diagram of an exemplary display system 1100, which is another example of a display system that utilizes an adaptable parallax barrier to support multiple viewing configurations. As shown in FIG. 11, display system 1100 includes driver circuitry 1102 and a screen 1104, wherein screen 1104 include a light generator 1122, an adaptable parallax barrier 1124 and a pixel array 1126. As further shown in FIG. 11, driver circuitry 1102 includes light generator driver circuitry 1112, adaptable parallax barrier driver circuitry 1114 and pixel array driver circuitry 1116.

Light generator 1122 emits light 1132. Adaptable parallax barrier 1124 is positioned proximate to light generator 1122. Barrier element array 1144 is a layer of adaptable parallax barrier 1124 that includes a plurality of barrier elements or blocking regions arranged in an array. Each barrier element of the array is configured to be selectively opaque or transparent. Barrier element array 1144 filters light 1132 received from light generator 1122 to generate filtered light 1134. Filtered light 1134 is configured to enable a two-dimensional image or a three-dimensional image (e.g., formed by a pair of two-dimensional images in filtered light 1134) to be formed based on images subsequently imposed on filtered light 1134 by pixel array 1126.

Pixel array 1126 includes a two-dimensional array of pixels (e.g., arranged in a grid or other distribution) like pixel array 122 of FIG. 1. However, pixel array 1126 is not self-illuminating, and instead is a light filter that imposes images (e.g., in the form of color, grayscale, etc.) on filtered light 1134 from adaptable parallax barrier 1124 to generate filtered light 1136 to include one or more images. Each pixel of pixel array 1126 may be a separately addressable filter (e.g., a pixel of a plasma display, an LCD display, an LED display, or of other type of display). Each pixel of pixel array 1126 may be individually controllable to vary the color imposed on the corresponding light passing through, and/or to vary the intensity of the passed light in filtered light 1136. In an embodiment, each pixel of pixel array 1126 may include a plurality of sub-pixels that correspond to separate color channels, such as a trio of red, green, and blue sub-pixels included in each pixel.

Driver circuitry 1102 receives control signals 1108 from control circuitry (not shown in FIG. 11). The control signals 1108 cause driver circuitry 1102 to place screen 1104 in a selected one of a plurality of different viewing configurations. In particular, based on control signals 1108, adaptable parallax barrier driver circuitry 1114 transmits drive signals 1154 that cause barrier element array 1144 to be placed in a state that supports the selected viewing configuration. Likewise, based on control signals 1108, pixel array driver circuitry 1116 transmits drive signals 1156 to cause pixels of one or more images (also referred to herein as "image pixels") to be rendered among the pixels of pixel array 1126 (also referred to herein as "display pixels") in a manner that is consistent with a current configuration of adaptable parallax barrier 1124. The selected viewing configuration may be a particular two-dimensional viewing configuration, a particular three-dimensional viewing configuration, or a viewing configuration that supports the display of different types of two-dimensional and/or three-dimensional content in different display regions.

As discussed in the aforementioned, incorporated U.S. patent application Ser. No. 12/982,020, filed on even date herewith and entitled "Backlighting Array Supporting Adaptable Parallax Barrier," conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions," the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 1122 includes a backlight array 1142 which is a two-dimensional array of light sources. Such light sources may be arranged, for example, in a rectangular grid. Each light source in backlight array 1142 is individually addressable and controllable to select an amount of light emitted thereby. A single light source may comprise one or more light-emitting elements depending upon the implementation. In one embodiment, each light source in backlight array 1142 comprises a single light-emitting diode (LED) although this example is not intended to be limiting.

The amount of light emitted by the individual light sources that make up backlight array 1142 can selectively controlled by drive signals 1152 generated by light generator driver circuitry 1112 so that the brightness associated with each of a plurality of display regions of screen 1104 can also be controlled. This enables display system 1100 to provide a desired brightness level for each display region automatically and/or in response to user input. For example, backlight array 1142 can be controlled such that a uniform level of brightness is achieved across different simultaneously-displayed display regions, even though the number of perceptible pixels per unit area varies from display region to display region. As another example, backlight array 1142 can be controlled such that the level of brightness associated with a particular display region is increased or reduced without impacting (or without substantially impacting) the brightness of other simultaneously-displayed display regions.

To help illustrate this, FIG. 12 provides an exploded view of an exemplary display system 1200 that implements a controllable backlight array as described immediately above. Display system 1200 comprises one implementation of display system 1100. As shown in FIG. 12, display system 1200 includes a light generator 1202 that includes a backlight array 1212, an adaptable parallax barrier 1204 that includes a barrier element array 1222 and a display panel 1206 that includes a pixel array 1232. These elements may be aligned with and positioned proximate to each other to create an integrated display screen.

In accordance with the example configuration shown in FIG. 12, a first portion 1234 of pixel array 1232 and a first portion 1224 of barrier element array 1222 have been manipulated to create a first display region that displays multi-view three-dimensional content, a second portion 1236 of pixel array 1232 and a second portion 1226 of barrier element array 1222 have been manipulated to create a second display region that displays a three-dimensional image, and a third portion of 1238 of pixel array 1232 and a third portion 1228 of barrier element array 1222 have been manipulated to create a third display region that displays a two-dimensional image. To independently control the brightness of each of the first, second and third display regions, the amount of light emitted by light sources included within a first portion 1214, a second portion 1216 and a third portion 1218 of backlight array 1212 can respectively be controlled. For example, the light sources within first portion 1214 may be controlled to provide greater luminosity than the light sources within second portion 1216 and third portion 1218 as the number of perceivable pixels per unit area will be smallest in the first display region with which first portion 1214 is aligned. In further accordance with this example, the light sources within second portion 1216 may be controlled to provide greater luminosity than the light sources within third portion 1218 since the number of perceivable pixels per unit area will be smaller in the second display region with which second portion 1216 is aligned than the third display region with which third portion 1218 is aligned. Of course, if uniform luminosity is not desired across the various display regions then other control schemes may be used.

Of course, the arrangement shown in FIG. 12 provides only a single teaching example. It should be noted that a display system in accordance with an embodiment can dynamically manipulate pixel array 1232 and barrier element array 1222 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1212 can also be dynamically manipulated in a coordinated fashion with pixel array 1232 and barrier element array 1222 to ensure that each display region is perceived at a desired level of brightness.

In the arrangement shown in FIG. 12, there is a one-to-one correspondence between each light source in backlight array 1212 and every display pixel in pixel array 1232. However, this need not be the case to achieve regional brightness control. For example, in certain embodiments, the number of light sources provided in backlight array 1212 is less than the number of pixels provided in pixel array 1232. For instance, in one embodiment, a single light source may be provided in backlight array 1212 for every N pixels provided in pixel array 1232, wherein N is an integer greater than 1. In an embodiment in which the number of light sources in backlight array 1212 is less than the number of pixels in pixel array 1232, each light source may be arranged so that it provides backlighting for a particular group of pixels in pixel array 1232, although this is only an example. In alternate embodiments, the number of light sources provided in backlight array 1212 is greater than the number of pixels provided in pixel array 1232.

Also, in the examples described above, light sources in backlight array 1212 are described as being individually controllable. However, in alternate embodiments, light sources in backlight array 1212 may only be controllable in groups. This may facilitate a reduction in the complexity of the control infrastructure associated with backlight array 1212. In still further embodiments, light sources in backlight array 1212 may be controllable both individually and in groups.

It is also noted that although FIGS. 11 and 12 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 13. In particular, FIG. 13 is a block diagram of a display system 1300 that includes a pixel array 1324 disposed between a light generator 1322 that includes a backlight array 1342 and an adaptable parallax barrier 1326 that includes a barrier element array 1344 to support the generation of two-dimensional and/or three-dimensional images perceivable in a viewing space 1306. In such alternate implementations, selective control of the luminosity of groups or individual ones of the light sources in backlight array 1342 may also be used to vary the backlighting luminosity associated with different display regions created by the interaction of backlight array 1342, pixel array 1324 and barrier element array 1344.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 14 provides an exploded view of an exemplary display system 1400 that implements a regional brightness control scheme based on pixel intensity as described immediately above. As shown in FIG. 14, display system 1400 includes a display panel 1402 and an adaptable parallax barrier 1404. Display system 1400 also includes a backlight panel, although this element is not shown in FIG. 14. These elements may be aligned with and positioned proximate to each other to create an integrated display screen.

As further shown in FIG. 14, display panel 1402 includes a pixel array 1412. Each of the pixels in a first portion 1414 of pixel array 1412 is individually controlled by pixel array driver circuitry to pass a selected amount of light produced by a backlight panel (not shown in FIG. 14), thereby producing display-generated light representative of a single two-dimensional image. Each of the pixels in a second portion 1416 of pixel array 1412 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 1400, will be perceived as a single three-dimensional image.

Adaptable parallax barrier 1404 includes barrier element array 1422 that includes a first portion 1424 and a second portion 1426. Barrier element array 1422 is aligned with pixel array 1414 such that first portion 1424 of blocking region array 1422 overlays first portion 1414 of pixel array 1412 and second portion 1426 of blocking region array 1422 overlays second portion 1416 of pixel array 1412. Adaptable parallax barrier driver circuitry causes all the barrier elements within first portion 1424 of barrier element array 1422 to be transparent. Thus, the two-dimensional image generated by the pixels of first portion 1414 of pixel array 1412 will simply be passed through to a viewer in a viewing space in front of display system 1400. Furthermore, the adaptable parallax barrier driver circuitry manipulates the barrier elements within second portion 1426 of blocking region array 1422 to form a plurality of parallel transparent strips alternated with parallel opaque strips, thereby creating a parallax effect that enables the two two-dimensional images generated by the pixels of second portion 1416 of pixel array 1412 to be perceived as a three-dimensional image by a viewer in the viewing space in front of display system 1400.

Assume that a viewer is positioned such that he/she can perceive both the two-dimensional image passed by first portion 1424 of barrier element array 1422 and the three-dimensional image formed through parallax by second portion 1426 of barrier element 1422. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 1412.

To address this issue, drive signals may be transmitted to display panel 1402 that selectively cause the pixels included in first portion 1414 of pixel array 1412 to pass less light from the backlight panel (i.e., become less intense), thereby reducing the brightness of the two-dimensional image produced from the pixels in first portion 1414 of pixel array 1412. Alternatively or additionally, drive signals may be transmitted to display panel 1402 that selectively cause the pixels included in second portion 1416 of pixel array 1412 to pass more light from the backlight panel (i.e., become more intense), thereby increasing the brightness of the three-dimensional image produced from the pixels in second portion 1416 of pixel array 1412. By controlling the intensity of the pixels in portions 1414 and 1416 of pixel array 1412 in this manner, the brightness of the two-dimensional image produced from the pixels in first portion 1414 of pixel array 1412 and the brightness of the three-dimensional image produced from the pixels in second portion 1416 of pixel array 1412 can be kept consistent. Additionally, by providing independent control over the intensity of the pixels in portions 1414 and 1416 of pixel array 1412, independent control over the brightness of the two-dimensional and three-dimensional images generated therefrom can also be achieved.

Of course, the arrangement shown in FIG. 14 provides only a single teaching example. It should be noted that a display system in accordance with an embodiment can dynamically manipulate pixel array 1412 and blocking element array 1422 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 1412 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 15. FIG. 15 illustrates a front perspective view of an exemplary display panel 1500. Display panel 1500 includes a pixel array 1502 that includes a first portion 1504 and a second portion 1506, wherein each of first portion 1504 and second portion 1506 includes a different subset of the pixels in pixel array 1502. It is to be assumed that first portion 1504 of pixel array 1502 is illuminated by backlighting provided by an aligned first portion of a backlight array (not shown in FIG. 15), wherein the backlight array is similar to backlight array 1142 described above in reference to FIG. 11. Second portion 1506 of pixel array 1502 is illuminated by backlighting provided by an aligned second portion of the backlight array. In one example the amount of light emitted by each light source in the second portion of the backlight array to illuminate second portion 1506 of pixel array 1502 is controlled such that it is greater than the amount of light emitted by each light source in the first portion of the backlight array to illuminate first portion 1504 of pixel array 1502. This control scheme may be applied, for example, to cause a three-dimensional image formed by interaction between the pixels in second portion 1506 of pixel array 1502 and an adaptable parallax barrier to appear to have a uniform brightness level with respect to a two-dimensional image formed by interaction between the pixels in first portion 1504 of pixel array 1504 and the adaptable parallax barrier.

However, the difference in the amount of light emitted by each light source in the first and second portions of the backlight array to illuminate corresponding first and second portions 1504 and 1506 of pixel array 1502 may also give rise to undesired visual artifacts. In particular, the difference may cause pixels in boundary areas immediately outside of second portion 1506 of pixel array 1502 to appear brighter than desired in relation to other pixels in first portion 1504 of pixel array 1502. For example, as shown in FIG. 15, the pixels in boundary area 1512 immediately outside of second portion 1506 of pixel array 1502 may appear brighter than desired in relation to other pixels in first portion 1504 of pixel array 1502. This may be due to the fact that the increased luminosity provided by the light sources in the second portion of the backlight array has "spilled over" to impact the pixels in boundary area 1512, causing those pixels to be brighter than desired. Conversely, the difference may cause pixels in boundary areas immediately inside of second portion 1506 of pixel array 1502 to appear dimmer than desired in relation to other pixels in second portion 1506 of pixel array 1502. For example, as shown in FIG. 15, the pixels in boundary area 1514 immediately inside of second portion 1506 of pixel array 1502 may appear dimmer than desired in relation to other pixels in second portion 1506 of pixel array 1502. This may be due to the fact that the reduced luminosity of the light sources in the first portion of the backlight array has "spilled over" to impact the pixels in boundary area 1514, causing those pixels to be dimmer than desired.

To address this issue, an embodiment may selectively control the amount of light passed by the pixels located in boundary region 1512 or boundary region 1514 to compensate for the undesired visual effects. For example, driver circuitry associated with pixel array 1502 may selectively cause the pixels included in boundary area 1512 of pixel array 1502 to pass less light from the backlight panel (i.e., become less intense), thereby reducing the brightness of the pixels in boundary area 1512, thus compensating for an undesired increase in brightness due to "spill over" from light sources in the second portion of the backlight array. Alternatively or additionally, driver circuitry associated with pixel array 1502 may selectively cause the pixels included in boundary area 1514 of pixel array 1502 to pass more light from the backlight panel (i.e., become more intense), thereby increasing the brightness of the pixels in boundary area 1514, thus compensating for an undesired reduction in brightness due to "spill over" from light sources in the first portion of the backlight array. By controlling the intensity of the pixels in boundary areas 1512 and 1514 in this manner, the undesired visual effects described above that can arise from the use of a backlight array to provide regional brightness control can be mitigated or avoided entirely.

The illustration provided in FIG. 15 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 100 described above in reference to FIG. 1 may be representative of such a system, provided that pixel array 122 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 100 can also be controlled. This enables display system 100 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 16 illustrates two exemplary configurations of an adaptable light manipulator 1600 that includes an adaptable parallax barrier and a brightness regulation overlay implemented as a light manipulating LCD sandwich with manipulator grayscale pixels. In FIG. 16, the grayscale pixels map to the display pixels on a one-to-one basis, but that need not be the case.

A first exemplary configuration of adaptable light manipulator 1600 is shown above the section line denoted with reference numeral 1602. In accordance with the first exemplary configuration, a three-dimensional region 1604 is created with fully transparent or fully opaque manipulator pixels that provide parallax barrier functionality and a two-dimensional region 1606 is created having continuous medium gray manipulator pixels. The medium gray manipulator pixels operate to reduce the perceived brightness of two-dimensional region 1606 to better match that of three-dimensional region 1604. It is noted that in other example configurations, two-dimensional region 1606 could instead comprise a three-dimensional region having a number of views that is different than three-dimensional region 1604, thus also requiring brightness regulation.

In the first exemplary configuration, no boundary region compensation is performed. In the second exemplary configuration, which is shown below section line 1602, boundary region compensation is performed. For example, a boundary region 1610 within two-dimensional region 1606 may be "lightened" to a light gray to compensate for any diminution of light that might occur near the boundary with three-dimensional region 1604. In contrast, the grayscale level of an inner portion 1608 of two-dimensional region 1606 is maintained at the same medium gray level as in the portion of two-dimensional region 1606 above section line 1602. As a further example, a first boundary region 1612 and a second boundary region 1614 within three-dimensional region 1604 comprise darker and lighter gray transitional areas, respectively, to account for light dispersion from two-dimensional region 1606. In contrast, an inner portion 1616 of three-dimensional region 1604 includes only fully transparent or fully opaque manipulator pixels consistent with a parallax barrier configuration and no brightness regulation.

In one embodiment, the configuration of adaptable light manipulator 1600 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 1600 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 16), adaptable light manipulator 1600 is implemented as an integrated adaptable parallax barrier and brightness regulation overlay. However, in alternate embodiments, adaptable light manipulator 1600 is implemented using an adaptable parallax barrier panel and an independent brightness regulation overlay panel.

III. User Controlled Regional Display of Mixed Two and Three Dimensional Content The foregoing section described a variety of display systems that utilize an adaptable light manipulator to achieve a variety of different viewing configurations of a display screen. To achieve such viewing configurations, coordinated driving of at least the adaptable light manipulator and a corresponding pixel array must be provided. Furthermore, in display systems that also utilize non-uniform light generation in support of simultaneous regional viewing of mixed two-dimensional and/or three-dimensional content types, coordinated driving of the adaptable light manipulator, the corresponding pixel array, and the non-uniform light generator must be provided. Some exemplary techniques for coordinated driving of such display elements are described in commonly-owned co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein.

This section describes exemplary systems and methods that support user controlled regional display of mixed two and three dimensional content. For example, FIG. 17A is a block diagram of an exemplary display system 1700 that support user controlled regional display of mixed two and three dimensional content in accordance with an embodiment. As shown in FIG. 17A, display system 1700 includes a display device 1702 and a control unit 1704. Display device 1702 includes circuitry 1730, a screen assembly 1714, a pixel array 1716, and a screen surface 1718. Screen surface 1718 is configured to support presentation of multiple instances of content in respective regions (a.k.a. areas) of screen surface 1718. For instance, first content may be presented in first area 1720A, and second content may be presented in second area 1720A.

Screen surface 1718 is shown in FIG. 17A to include two areas 1720A and 1720B for illustrative purposes and is not intended to be limiting. It will be recognized that screen surface 1718 may present any suitable number of instances of content in a corresponding number of regions of screen surface 1718. It will be further recognized that areas 1720A and 1720B may partially overlap, fully overlap, not overlap (as shown in FIG. 17A), be configured such that area 1720A is within area 1720B, be configured such that area 1720B is within area 1720A, etc. Moreover, areas (e.g., areas 1720A and 1720B) may be substantially rectangular in shape, as shown in FIG. 17A, or may have other shapes, including square, round or rounded, triangular or other polygon, or any other shape, such as the shape of an object, a displayed character (e.g., a person, an animal, an animated character, etc.), etc. Some examples of non-rectangular areas are shown in FIG. 25, which is described below.

Screen assembly 1714 includes first and second assembly regions 1732A and 1732B that correspond to first and second areas 1720A and 1720B. Pixel array 1716 includes first and second array portions 1734A and 1734B that correspond to first and second areas 1720A and 1720B. Pixel array 1716 is shown in FIG. 17A to be a self-illuminating or light-generating pixel array for illustrative purposes and is not intended to be limiting. For example, screen assembly 1714 is shown to be placed between pixel array 1716 and screen surface 1718, such that screen assembly 1714 filters light 1722A and 1722B that emits from respective portions 1734A and 1734B of pixel array 1716 for presentation of the first and second content in respective areas 1720A and 1720B. In accordance with this example, screen assembly 1714 may include an adaptable light manipulator. For instance, if the adaptable light manipulator includes a parallax barrier (e.g., parallax barrier 124, 1124, or 1326), first assembly region 1732A may include a first subset of barrier elements that are included in the parallax barrier, and second assembly region 1732B may include a second subset of the barrier elements that are included in the parallax barrier.

The arrangement of pixel array 1716 and screen assembly 1714 with respect to screen surface 1718 shown in FIG. 17A is merely one exemplary arrangement. For instance, FIGS. 17B and 17C show alternative arrangements of pixel array 1716 and screen assembly 1714 with respect to screen surface 1718 in accordance with embodiments. In FIG. 17B, pixel array 1716 is shown to be a light filter that imposes images (e.g., in the form of color, grayscale, etc.) on filtered light 1742A and 1742B from respective regions 1732A and 1732B of screen assembly 1714'. In this document, whenever a prime is used to modify a reference number, the modified reference number indicates an example implementation of the element that corresponds to the reference number. For example, screen assembly 1714' is an exemplary implementation of screen assembly 1714. While the primes are used for purposes of discussing potential distinctions between the arrangements shown in FIGS. 17A-17C, references to screen assembly 1714 generally (without the use of primes) will be understood to apply to one or more of screen assembly 1714 shown in FIG. 17A, screen assembly 1714' shown in FIG. 17B, and/or screen assembly 1714" shown in FIG. 17C.

Referring to FIG. 17B, pixel array 1716 is shown to be placed between screen assembly 1714' and screen surface 1718. For example, screen assembly 1714' may include an adaptable light manipulator (e.g., parallax barrier 124, 1124, or 1326) and/or a light generator (e.g., light generator 1122 or 1322). In accordance with this example, first assembly region 1732A may include a first subset of barrier elements that are included in a parallax barrier and/or a first subset of light sources that are included in the light generator, and second assembly region 1732B may include a second subset of the barrier elements that are included in the parallax barrier and/or a second subset of the light sources that are included in the light generator.

In FIG. 17C, pixel array is shown to be placed between a first portion 1782 of screen assembly 1714″ and a second portion of screen assembly 1714‴. First portion 1782 is shown to include first and second upper portions 1762A and 1762B that correspond to respective first and second areas 1720A and 1720B of screen surface 1718. For example, first portion 1782 may include an adaptable light manipulator. In accordance with this example, first upper region 1762A may include a first subset of barrier elements that are included in a parallax barrier, and second upper region 1762B may include a second subset of the barrier elements that are included in the parallax barrier.

Second portion 1784 is shown to include first and second lower portions 1752A and 1752B that correspond to respective first and second areas 1720A and 1720B of screen surface 1718. For example, second portion 1782 may include a light generator. In accordance with this example, first lower region 1752A may include a first subset of light sources that are included in the light generator, and second lower region 1752B may include a second subset of the light sources that are included in the light generator.

Referring back to FIG. 17A, circuitry 1730 includes media delivery circuitry 1708, control circuitry 1710, driver circuitry 1712, first communication circuitry 1742, and first input circuitry 1744. First communication circuitry 1742 is configured to receive an input signal 1706 from control unit 1704 and to provide a control signal 1748 that is based on the input signal 1706 to control circuitry 1710. The input signal 1706 (and the control signal 1748 which is based thereon) may specify any of a variety of settings for regionally adjustable characteristics that are associated with regions (e.g., regions 1732A and 1732B) of screen assembly 1714. A regionally adjustable characteristic is a characteristic of a screen assembly for which different settings may be applied to different regions of the screen assembly. A setting of a regionally adjustable characteristic does not specify which content is to be associated with a region of a screen assembly. Rather, the setting specifies a value of the regionally adjustable characteristic that is to control or affect a visual characteristic that is associated with the content that is to be presented in that region.

Accordingly, merely changing a setting of a regionally adjustable characteristic with respect to a region of a screen assembly does not change which content is associated with that region. Examples of a regionally adjustable characteristic include but are not limited to an image brightness control, an image contrast control, an image colorization control, an image resolution control for controlling a number of display pixels to be used to represent image pixels, a viewing configuration control for controlling a number of perspectives to be represented by content to be viewed, a perspective control for controlling which perspectives of a designated number of perspectives are to be represented by content to be viewed (e.g., perspectives 1 and 5 vs. perspectives 3 and 7), etc. Input signal 1706 (and control signal 1748 which is based thereon) may further specify which content is to be presented in which regions of screen surface 1718.

First input circuitry 1744 is configured to accept input from a viewer directly without the viewer needing to use control unit 1704. First input circuitry 1744 provides a control signal 1750 that is based on the input from the viewer. For example, the viewer may select settings for regionally adjustable characteristics of screen assembly 1714. In accordance with this example, first input circuitry 1744 may generate the control signal 1750 to specify the selected settings. First input circuitry 1744 may include any suitable circuitry that is capable of accepting input from a user. For example, first input circuitry 1744 may include a keyboard, a mouse, a touch screen, a gamepad or other type of gaming console input element, or one or more sensors including but not limited to video cameras, microphones, motion sensors, tactile sensors, etc.

Accordingly, the control signal 1750 may specify any of a variety of settings for regionally adjustable characteristics that are associated with regions (e.g., regions 1732A and 1732B) of screen assembly 1714, as described above with reference to control signal 1748. Control signal 1750 may further specify which content is to be presented in which regions of screen surface 1718.

Media delivery circuitry 1708 is configured to obtain one or more images for display by display device 1702 via screen surface 1718. The images may be static images or a series of images that taken together comprise a video stream. Such images may be represented as digital or analog signals.

In one embodiment, the images delivered by media delivery circuitry 1708 may be categorized into at least three different content types: (1) two-dimensional content, comprising a single frame that provides a single view of a subject (for a static image) or a series of frames that provide a single view of a subject (for video); (2) single-view three-dimensional content, comprising two views of a subject, each view comprising a single frame (for a static image) or a series of frames (for video); and (3) multi-view three-dimensional content, comprising some integer multiple of two views of a subject (e.g., four views, six views, eight views, etc.), each view comprising a single frame (for a static image) or a series of frames (for video).

Control circuitry 1710 is configured to receive content to be displayed from media delivery circuitry 1708. Control circuitry 1710 is further configured to receive a control signal 1748 from first communication circuitry 1742 or a control signal 1750 from first input circuitry 1744. Based on the received content and the control signal 1748 or 1750, control circuitry 1710 is configured to control driver circuitry 1712 to drive screen assembly 1714 and pixel array 1716 in a manner that causes the content received from media delivery circuitry 1708 to be presented to a viewer (e.g., a user of control unit 1704) in accordance with the settings for the regionally adjustable characteristics that are specified by the control signal 1748 or 1750 (and, in some embodiments, further based on which content is specified by the control signal 1748 or 1750).

Driver circuitry 1712 includes pixel array driver circuitry (e.g., pixel array driver circuitry 112 or 1116) for controlling pixel array 1716. Control circuitry 1710 controls the pixel array driver circuitry to send drive signals 1726 to pixel array 1716 that cause image pixels associated with the content to be displayed to be mapped to display pixels of pixel array 1716 in a manner that supports the specified settings for the regionally adjustable characteristics. For example, if the control signal 1748 or 1750 specifies that perspectives 1 and 4 of 3D4 content are to be presented in first area 1720A of screen surface 1718, control circuitry 1710 may control the pixel array driver circuitry to send drive signals 1726 to pixel array 1716 that cause image pixels corresponding to perspectives 1 and 4 of the 3D4 content to be mapped to a portion of the display pixels of pixel array 1716 that correspond to first area 1720A. In another example, if the control signal 1748 or 1750 specifies a resolution to be applied to content that is to be presented in second area 1720B, control circuitry 1710 may control the pixel array driver circuitry to send drive signals 1726 to pixel array 1716 that cause image pixels corresponding to the content to be mapped to a portion of the display pixels of pixel array 1716 that corresponds to second area 1720B in accordance with the resolution specified by the control signal 1748 or 1750.

Control circuitry 1710 controls driver circuitry 1712 to send drive signals 1724 to screen assembly 1714 to place screen assembly 1714 in a state that supports the settings for the regionally adjustable characteristics, as specified by the control signal 1748 or 1750. For instance, the drive signals 1724 may be configured to apply a first setting for a regionally adjustable characteristic to first assembly region 1732A. The drive signals 1724 may be further configured to apply a second setting for the regionally adjustable characteristic to second assembly region 1732B.

In some embodiments, screen assembly 1714 includes an adaptable light manipulator (e.g., parallax barrier 124, 1124, or 1326). In accordance with these embodiments, driver circuitry 1712 includes adaptable light manipulator driver circuitry (e.g., adaptable parallax barrier driver circuitry 114 or 1114) for controlling the adaptable light manipulator. In further accordance with these embodiments, control circuitry 1710 controls the adaptable light manipulator driver circuitry to send the drive signals 1724 to the adaptable light manipulator to place the adaptable light manipulator in a state that supports the specified settings for the regionally adjustable characteristics.

In some embodiments, screen assembly 1714 includes a light generator (e.g., light generator 1122 or 1322). In accordance with these embodiments, driver circuitry 1712 includes light generator driver circuitry (e.g., light generator driver circuitry 1112) for controlling the light generator. In further accordance with these embodiments, control circuitry 1710 controls the light generator driver circuitry to send the drive signals 1724 to the light generator to cause the light generator to produce light in a manner (e.g., a non-uniform manner) that supports the specified settings for the regionally adjustable characteristics. For example, the light generator may be used in conjunction with an adaptable light manipulator. The light generator may include a backlight array, and the adaptable light manipulator may include a barrier element array. In accordance with this example, control circuitry 1710 may control the light generator driver circuitry to send the drive signals 1724 to cause different levels of luminosity to be produced by respective portions of the backlight array that are aligned with respective portions of the barrier element array, as described above with reference to FIG. 12.

Depending on the embodiment, display device 1702 may be a display system or a display architecture wherein the illustrated elements are spread across multiple device housings.

Control unit 1704 is intended to generally represent any type of control unit that may be used to receive user input, including but not limited to a remote control device, a personal computer (e.g., a desktop computer, a laptop computer, or a tablet computer), a smart phone, a traditional computer input device such as a keyboard or mouse, a touch screen, a gamepad or other type of gaming console input device, etc. Control unit 1704 includes second communication circuitry 1728 and second input circuitry 1738. Communication circuitry 1728 is configured to generate input signal 1706 in response to a control signal 1746 that is received from second input circuitry 1738.

Second input circuitry 1738 is configured to provide the control signal 1746 to second communication circuitry 1728 based on input that is received from a user who has access to control unit 1704. For example, the input from the user may specify selected settings for regionally adjustable characteristics of screen assembly 1714. In accordance with this example, second input circuitry 1738 may generate the control signal 1746 to specify the selected settings. Second input circuitry 1738 may include any suitable circuitry that is capable of accepting input from a user. For example, second input circuitry 1738 may include one or more sensors including but not limited to video cameras, microphones, motion sensors, tactile sensors, etc.

Control unit 1704 is shown in FIG. 17 to be external to display device 1702 for illustrative purposes and is not intended to be limiting. It will be recognized that control unit 1704 may be included in display device 1702. Moreover, it will be further recognized that control unit 1704 may be coupled to control circuitry 1710 via any suitable path, whether wired, wireless, or a combination thereof. Further detail regarding an exemplary control unit is provided below with reference to FIG. 23.

User controlled regional display of mixed two and three dimensional content may be supported in a variety of ways according to embodiments. For instance, FIG. 18 depicts a flowchart 1800 of an exemplary method for supporting user controlled regional display of mixed two and three dimensional content in accordance with an embodiment. Flowchart 1800 may be performed by circuitry 1730 shown in FIG. 17, for example. However the method of flowchart 1800 is not limited to that embodiment. Further structural and operational embodiments will be apparent to persons skilled in the relevant art(s) based on the discussion regarding flowchart 1800. Flowchart 1800 is described as follows.

Flowchart 1800 begins with step 1802. In step 1802, a first setting for a regionally adjustable characteristic of an adaptable screen assembly is applied to a first region of the adaptable screen assembly to support first visual content in a first area of a screen surface. For example, as described above with respect to FIGS. 17A-17C, driver circuitry 1712 may apply a first setting for a regionally adjustable characteristic of screen assembly 1714 to a first region 1732A, 1752A, or 1762A (or a combination of 1752A and 1762A) of screen assembly 1714 to support the first visual content in first area 1720A of screen surface 1718. In accordance with this example, driver circuitry 1712 may apply the first setting based on a driver control signal 1736 that is received from control circuitry 1710.

At step 1804, a control signal is delivered to the adaptable screen assembly to cause application of a second setting for the regionally adjustable characteristic to a second region of the adaptable screen assembly to support second visual content in a second area of the screen surface. The second setting is different from the first setting. The control signal is generated in response to viewer input. For example, driver circuitry 1712 may deliver a control signal 1724 to screen assembly 1714 to cause application of a second setting for the regionally adjustable characteristic to a second region 1732B, 1752B, or 1762B (or a combination of 1752B and 1762B) of screen assembly 1714 to support the second visual content in second area 1720B of screen surface 1718. In accordance with this example, driver circuitry 1712 may deliver the control signal 1724 based on the driver control signal 1736 that is received from control circuitry 1710.

In one example, the regionally adjustable characteristic may include a brightness control. In accordance with this example, the first setting may include a first region brightness setting, and the second setting may include a second region brightness setting that is different from the first region brightness setting.

In another example, the regionally adjustable characteristic may include a contrast control. In accordance with this example, the first setting may include a first image contrast setting, and the second setting may include a second image contrast setting that is different from the first image contrast setting.

In yet another example, the regionally adjustable characteristic may include a three-dimensional intensity control. In accordance with this example, the first setting may include a first three-dimensional intensity setting, and the second setting may include a second three-dimensional intensity setting. A three-dimensional intensity indicates a number of perspectives that are represented by content. A greater number of perspectives corresponds to a greater three-dimensional intensity. Fewer perspectives corresponds to a lesser three-dimensional intensity. For instance, a three-dimensional intensity setting that indicates two perspectives corresponds to 3D2 content; a three-dimensional intensity setting that indicates four perspectives corresponds to 3D4 content, and so on.

FIG. 19 is a block diagram of another exemplary display system 1900 that supports user controlled regional display of mixed two and three dimensional content in accordance with an embodiment. As shown in FIG. 19, display system 1900 includes a display device 1902, a control unit 1904, and a display controller 1930. Display device 1902 includes driver circuitry 1912, a screen assembly 1914, a pixel array 1916, and a screen surface 1918, which operate in a like manner to driver circuitry 1712, screen assembly 1714, pixel array 1716, and screen surface 1718, respectively, as described above with reference to FIG. 17A. For instance, driver circuitry 1912 provides drive signals 1924 and 1926 to screen assembly 1914 and pixel array, respectively, to support presentation of first content in first area 1920A and second content in second area 1920B. In FIG. 19, second area 1920B is shown to be included in first area 1920A for illustrative purposes and is not intended to be limiting. For instance, areas 1920A and 1920B may partially overlap, fully overlap, not overlap, be configured such that area 1920A is within area 1920B, be configured such that area 1920B is within area 1920A (as shown in FIG. 19), etc. It will be recognized that the arrangement of screen assembly 1914 and pixel array 1916 with respect to screen surface 1918 may be modified as described above with respect to FIGS. 17B and 17C.

As shown in FIG. 19, media delivery circuitry 1908, control circuitry 1910, first communication circuitry 1942, and first input circuitry 1944 are incorporated into display controller 1930, which is external to display device 1902. For instance, display controller 1930 may be incorporated into a set top box or a personal computer. The set top box may be any type of set top box including but not limited to fiber, Internet, cable, satellite, or terrestrial digital.

Media delivery circuitry 1908, control circuitry 1910, first communication circuitry 1942, and first input circuitry 1944 operate in a like manner to media delivery circuitry 1708, control circuitry 1910, first communication circuitry 1742, and first input circuitry 1744, respectively, as described above with reference to FIG. 17A. For instance, media delivery circuitry 1908 is configured to obtain one or more images for display by display device 1902 via screen surface 1918. Control circuitry 1910 is configured to receive content to be displayed from media delivery circuitry 1908. Control circuitry 1910 is further configured to receive a control signal 1948 from first communication circuitry 1942 or a control signal 1950 from first input circuitry 1944. Control circuitry 1910 provides a driver control signal 1936 that is based on the control signal 1948 or 1950 to driver circuitry 1912.

First communication circuitry 1942 is configured to receive an input signal 1906 from control unit 1904 and to provide the control signal 1948, which is based on the input signal 1906, to control circuitry 1910. The input signal 1906 (and the control signal 1948 which is based thereon) may specify any of a variety of settings for regionally adjustable characteristics that are associated with regions (e.g., regions 1932A and 1932B) of screen assembly 1914. First input circuitry 1944 is configured to accept input from a viewer directly without the viewer needing to use control unit 1904. First input circuitry 1944 provides the control signal 1950 to control circuitry 1910. For instance, first input circuitry 1944 may generate the control signal 1950 to specify setting(s) for regionally adjustable characteristics that are selected by the viewer.

FIG. 20 is a block diagram of display controller 2000, which is an exemplary implementation of a display controller 1930 shown in FIG. 19, in accordance with an embodiment. As shown in FIG. 20, display controller 2000 includes interface circuitry 2002, processing circuitry 2004, and output circuitry 2006. Interface circuitry 2002 serves as an input interface for display controller 2000. Processing circuitry 2004 receives an input signal 2008 through interface circuitry 2002. Input signal 2008 may specify any of a variety of settings for regionally adjustable characteristics that are associated with regions of a screen assembly.

In accordance with some embodiments, prior to receipt of the input signal 2008, processing circuitry 2004 sends control signals 2010 via output circuitry 2006 to a display (e.g., display device 1902). The control signals 2010 are intended to produce both a first configuration of a first portion (e.g., first assembly region 1932A) of a screen assembly that is included in the display device and a second configuration of a second portion (e.g., second assembly region 1932B) of the screen assembly. The first portion is associated with a first area (e.g., first area 1920A) of a screen surface. The second portion is associated with a second area (e.g., second area 2910B) of the screen surface. The first configuration is different from then second configuration. In response to receipt of input signal 2008, processing circuitry 2004 delivers via output circuitry 2006 a modification signal 2012 to the display. The modification signal 2012 is intended to cause application of a third configuration to the second portion of the screen assembly to modify a visual characteristic associated with the second visual content. The third configuration is different from the second configuration. Examples of a visual characteristic include but are not limited to image brightness, image contrast, image resolution, a number of perspectives to be represented by the content (e.g., 3D intensity), which perspectives of a designated number of perspectives are to be represented by the content, etc.

In accordance with some embodiments, prior to receipt of the input signal 2008, processing circuitry 2004 sends control signals 2010 via output circuitry 2006 to a display (e.g., display device 1902). The control signals 2010 are intended to produce both a first configuration of first visual content associated with a first area (e.g., first area 1920A) of a screen and a second configuration of second visual content associated with a second area (e.g., second area 1920B) of the screen. The second configuration is a three-dimensional configuration. The first configuration is different from the second configuration. For example, the first configuration may be a two-dimensional configuration. In another example, the first configuration may be another three-dimensional configuration that represents a number of perspectives that is different from a number of perspectives that is represented by the second configuration. In response to the receipt of the input signal 2008, processing circuitry 2004 delivers the modification signal 2012 to the display via output circuitry 2006. The modification signal 2012 is intended to cause modification of the second configuration that will correspondingly change a three-dimensional characteristic of the second visual content. A three-dimensional characteristic is a characteristic that is associated with three-dimensional content. Examples of a three-dimensional characteristic include but are not limited to 3D intensity, a number of perspectives that is represented by the three-dimensional content, which perspectives of a designated number of perspectives are to be represented by the three-dimensional content, brightness of the three-dimensional content, etc.

FIGS. 21 and 22 depict flowcharts 2100 and 2200 of other exemplary methods for supporting user controlled regional display of mixed two and three dimensional content in accordance with embodiments. Flowcharts 2100 and 2200 may be performed by control circuitry 2000 shown in FIG. 20, for example. However the methods of flowcharts 2100 and 2200 are not limited to that embodiment. Further structural and operational embodiments will be apparent to persons skilled in the relevant art(s) based on the discussion regarding flowcharts 2100 and 2200.

As shown in FIG. 21, flowchart 2100 begins at step 2102. In step 2102, control signals are sent to a display intended to produce both a first configuration of a first portion of a screen assembly and a second configuration of a second portion of the screen assembly. The first portion is associated with a first area of a screen surface in which first visual content is presented. The second portion is associated with a second area of the screen surface in which second visual content is presented. The first configuration is different from the second configuration. In an example implementation, processing circuitry 20004 sends control signals 2010 to the display (e.g., display device 1902) via output circuitry 2006.

At step 2104, an input signal is received. In an example implementation, processing circuitry 2004 receives input signal 2008 via interface circuitry 2002.

At step 2106, a modification signal is delivered to the display to cause application of a third configuration to the second portion of the screen assembly to modify a visual characteristic associated with the second visual content. The third configuration is different from the second configuration. In an example implementation, processing circuitry 204 delivers modification signal 2012 via output circuitry 2006 to the display.

In one example, the first configuration includes a first brightness control setting that is associated with a first region brightness. The second configuration includes a second brightness control setting that is associated with a second region brightness. The second brightness control setting is different from the first brightness control setting. The third configuration includes a third brightness control setting that is associated with a third region brightness. In accordance with this example, the third brightness control setting is different from the second brightness control setting.

In another example, the first configuration includes a first contrast control setting that is associated with a first region contrast. The second configuration includes a second contrast control setting that is associated with a second region contrast. The second contrast control setting is different from the first contrast control setting. The third configuration includes a third contrast control setting that is associated with a third region contrast. In accordance with this example, the third contrast control setting is different from the second contrast control setting.

In yet another example, the first configuration includes a first three-dimensional intensity control setting that is associated with a first region three-dimensional intensity. A three-dimensional intensity indicates a number of perspectives that are represented by content. A greater number of perspectives corresponds to a greater three-dimensional intensity. Fewer perspectives corresponds to a lesser three-dimensional intensity. The second configuration includes a second three-dimensional intensity control setting that is associated with a second region three-dimensional intensity. The second three-dimensional intensity control setting is different from the first three-dimensional intensity control setting. The third configuration includes a third three-dimensional intensity control setting that is associated with a third region three-dimensional intensity. In accordance with this example, the third three-dimensional intensity control setting is different from the second three-dimensional intensity control setting.

In still another example, the first configuration includes a configuration of a first subset of light sources that is included in a first portion of a backlight that is included in the first portion of the screen assembly. The second configuration includes an initial configuration of a second subset of the light sources that is included in a second portion of the backlight that is included in the second portion of the screen assembly. The configuration of the first subset is different from the initial configuration of the second subset. The third configuration includes a modified configuration of the second subset of the light sources. In accordance with this example, the initial configuration of the second subset is different from the modified configuration of the second subset.

In yet another example, the first configuration includes a configuration of a first subset of barrier elements that is included in a first portion of a parallax barrier that is included in the first portion of the screen assembly. The second configuration includes an initial configuration of a second subset of the barrier elements that is included in a second portion of the parallax barrier that is included in the second portion of the screen assembly. The configuration of the first subset is different from the initial configuration of the second subset. The third configuration includes a modified configuration of the second subset of the barrier elements. In accordance with this example, the initial configuration of the second subset is different from the modified configuration of the second subset.

As shown in FIG. 22, flowchart 2200 begins at step 2202. In step 2202, control signals are sent to a display intended to produce both a first configuration of first visual content associated with a first area of a screen and a second configuration of second visual content associated with a second area of the screen. The second configuration is a three-dimensional configuration. The first configuration is different from the second configuration. For instance, the first configuration may be a two-dimensional configuration. In another example, the first configuration may be another three-dimensional configuration that represents a number of perspectives that is different from a number of perspectives that is represented by the second configuration. In an example implementation, processing circuitry 2004 sends control signals 2010 to the display (e.g., display device 1902) via output circuitry 2006.

At step 2204, an input signal is received. In an example implementation, processing circuitry 2004 receives input signal 2010 via interface circuitry 2002.

At step 2206, a modification signal is delivered to the display to cause modification of the second configuration that will correspondingly change a three-dimensional characteristic of the second visual content. In an example implementation, processing circuitry 2004 delivers modification signal 2012 to the display via output circuitry 2006.

In an example, the three-dimensional characteristic of the second visual content includes a cumulative brightness that is associated with perspectives that are included in the second visual content. In accordance with this example, the brightnesses of the respective perspectives are combined (e.g., added) to provide the cumulative brightness. In another example, the three-dimensional characteristic includes a number of perspectives that are represented by the second visual content. In yet another example, the three-dimensional characteristic includes a specified subset of perspectives that is represented by the second visual content. For instance, if the second visual content is 3D8 content, the specified subset of perspectives may include perspectives 5, 6, 7, and 8, but not perspectives 1, 2, 3, and 4. The exemplary perspectives mentioned herein are provided for illustrative purposes and are not intended to be limiting. It will be recognized that the specified subset may include any suitable number and/or combination of perspectives of the second visual content.

In an example, the modification signal includes a control signal that is configured to control pixels in a pixel array of the display to at least assist in the modification of the second configuration. In another example, the modification signal includes a control signal that is configured to control light sources that are included in a backlight of the display to at least assist in the modification of the second configuration. In yet another example, the modification signal includes a control signal that is configured to control barrier elements that are included in a parallax barrier of the display to at least assist in the modification of the second configuration.

FIG. 23 shows a control unit 2300, which is an exemplary implementation of a control unit 1704 or 1904 shown in respective FIG. 17 or 19 in accordance with an embodiment. As shown in FIG. 23, control unit 2300 includes directional control element 2302, a select element 2304, a content selector element 2306, a region selector element 2308, a regional brightness element 2310, a regional contrast element 2312, a camera selector element 2314, a regional resolution element 2316, and a regional colorization element 2318. These elements enable a user to change settings of regionally adjustable characteristics of a screen assembly on a region-by-region basis.

As shown in FIG. 23, directional control element 2302 includes an up arrow 2302, a down arrow 2322, a left arrow 2324, and a right arrow 2326. Arrows 2320, 2322, 2324, and 2326 are selectable by the user to move a pointer that is displayed on a screen surface (e.g., screen surface 1718 or 1918) up, down, left, or right, respectively. For example, the user may move the pointer on the screen surface among the areas of the screen surface to identify an area with respect to which a user desires to change a setting of a regionally adjustable characteristic of a screen assembly region that corresponds to that area. For instance, an area may become highlighted as the pointer overlaps with that area. The area may become de-highlighted once the pointer no longer overlaps with the area. In another example, the user may select the region selector element 2308, which may cause a list of the areas of the display that correspond to respective regions of the screen assembly to be displayed on the screen surface. The user may operate the directional control element 2302 to browse through the list. In both examples, the user may select a highlighted area by selecting the select element 2304.

Once a user selects an area of the screen surface, the user may select the regional brightness element 2310 to change a setting of a regional brightness control that corresponds to that area. For instance, the regional brightness control is a characteristic of a region of a screen assembly that corresponds to the selected area of the screen. The user may select the regional contrast element 2312 to change a setting of a regional contrast control that corresponds to the area. The user may select the camera selector element 2314 to change a setting of a viewing configuration control and/or a perspective control that corresponds to the area. A viewing configuration control controls a number of perspectives to be represented by content that is to be presented in the area. A perspective control controls which perspectives of a designated number of perspectives are to be represented by content that is to be presented in the area. The user may select the regional resolution element 2316 to change a setting of a regional resolution control that corresponds to the area. The user may select the regional colorization element 2318 to change a setting of a regional colorization control that corresponds to the area. The user may browse through the various settings that are available for each control by operating the directional control element 2302 once the corresponding element 2308, 2310, 2312, 2314, 2316, or 2318 is selected.

The user may select the content that is to be presented in each area of the screen surface by selecting the content selector element 2306 once the user selects the area of the screen surface. For instance, selection of the content selector element 2306 may cause a list of the instances of content that are available from media delivery circuitry (e.g., media delivery circuitry 1708 or 1908) to be displayed on the screen surface. The user may operate the directional control element 2302 to browse through the list. If the user identifies content that the user desires to view in the area, the user may select the select element 2304 to cause the identified content to be presented in the area.

Control unit 2300 may include elements that are not shown in FIG. 23. For example, control unit 2300 may include a shape element that is selectable by the user to change a setting of a shape control that controls a shape of a selected area of the screen surface. Control unit 2300 may include a location element that is selectable by the user to change a setting of a location control that controls a location of a selected area of the screen surface. Control unit 2300 may include a speed element that is selectable by the user to change a setting of a speed control that controls a speed with which a selected area moves with respect to the screen surface. For instance, the speed element may be used to increase or decrease the speed. Control unit 2300 may include a freeze element that is selectable by the user to change a setting of a freeze control that controls whether a selected area is allowed to move with respect to the screen surface. For instance, the freeze element may be used to cause the selected area to remain stationary on the screen surface regardless of a speed that is selected using the speed element. When the selected area is stationary, the freeze element may be used to cause the selected area to move (e.g., at a speed that is selected using the speed element).

Control unit 2300 may include a 3D effect element that is selectable by the user to change a setting of a 3D effect control that controls a 3D effect of the content that is presented in a selected area of the screen surface. For instance, the 3D effect element may be used to increase or decrease the 3D effect. Increasing the 3D effect causes a difference between perspectives that are represented by the content to increase. Decreasing the 3D effect causes the difference between the perspectives to decrease. Control unit 2300 may include a 3D depth element that is selectable by the user to change a setting of a 3D depth control that controls a 3D depth of a selected area of the screen surface. For instance, the 3D depth element may be used to cause the content that is presented in the selected area to appear to move toward the user or away from the user.

Control unit 2300 may include a size element that is selectable by the user to change a setting of a size control that controls a size of a selected area of the screen surface. For instance, the size element may be used to increase or decrease the size of the area. Control unit 2300 may include a close element that is selectable by the user to remove a selected area from the screen surface. Control unit 2300 may include an open element that is selectable by the user to create a new area in the screen surface.

Control unit 2300 may include a priority element that is selectable by the user to change a setting of a priority control that controls a priority of a selected area of the screen surface. For instance, the priority element may be used to send the selected area to the background on the screen surface (i.e., behind other areas of the screen surface). The priority element may be used to bring the selected area to the foreground on the screen surface (i.e., in front of other areas of the screen surface). The priority element may be used to incrementally change a priority of the selected area among multiple priority levels of a hierarchical priority construct. For instance, changing the priority of the selected area to correspond to a third priority level may place the selected area behind areas having priorities that correspond to first or second levels of the hierarchical priority construct, but in front of areas having priorities that correspond to fourth or greater levels of the hierarchical priority construct.

Selection of any of the elements 2302, 2304, 2306, 2308, 2310, 2312, 2314, 2316, and 2318 and others described herein causes an input signal (e.g., input signal 1706 or 1906) to be delivered to control circuitry (e.g., control circuitry 1710 or 1910) for further processing. Each of the aforementioned elements may be a button, an icon on a display, or any other interface element that is suitable for receiving input from a user. For example, the aforementioned elements are shown to be visual elements that are controllable and/or selectable using tactile input from the user. It will be recognized that the elements may be audibly controlled and/or selected using audible commands from the user.

FIG. 24 is a block diagram of an example practical implementation of a display system 2400 in accordance with an embodiment of the present invention. As shown in FIG. 24, display system 2400 generally comprises control circuitry 2402, driver circuitry 2404 and a screen 2406.

As shown in FIG. 24, control circuitry 2402 includes a processing unit 2414, which may comprise one or more general-purpose or special-purpose processors or one or more processing cores. Processing unit 2414 is connected to a communication infrastructure 2412, such as a communication bus. Control circuitry 2402 may also include a primary or main memory (not shown in FIG. 24), such as random access memory (RAM), that is connected to communication infrastructure 2412. The main memory may have control logic stored thereon for execution by processing unit 2414 as well as data stored thereon that may be input to or output by processing unit 2414 during execution of such control logic.

Control circuitry 2402 may also include one or more secondary storage devices (not shown in FIG. 24) that are connected to communication infrastructure 2412, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provides an additional means for storing control logic for execution by processing unit 2414 as well as data that may be input to or output by processing unit 2414 during execution of such control logic.

Control circuitry 2402 further includes a user input interface 2418 and a media interface 2420. User input interface 2418 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Media interface 2420 is intended to represent any type of interface that is capable of receiving media content such as video content or image content. In certain implementations, media interface 2420 may comprise an interface for receiving media content from a remote source such as a broadcast media server, an on-demand media server, or the like. In such implementations, media interface 2420 may comprise, for example and without limitation, a wired or wireless internet or intranet connection, a satellite interface, a fiber interface, a coaxial cable interface, or a fiber-coaxial cable interface. Media interface 2420 may also comprise an interface for receiving media content from a local source such as a DVD or Blu-Ray disc player, a personal computer, a personal media player, smart phone, or the like. Media interface 2420 may be capable of retrieving video content from multiple sources.

Control circuitry 2402 further includes a communication interface 2422. Communication interface 2422 enables control circuitry 2402 to send control signals via a communication medium 2452 to another communication interface 2430 within driver circuitry 2404, thereby enabling control circuitry 2402 to control the operation of driver circuitry 2404. Communication medium 2452 may comprise any kind of wired or wireless communication medium suitable for transmitting such control signals.

As shown in FIG. 24, driver circuitry 2404 includes the aforementioned communication interface 2430 as well as pixel array driver circuitry 2432 and adaptable light manipulator driver circuitry 2434. Driver circuitry also optionally includes light generator driver circuitry 2436. Each of these driver circuitry elements is configured to receive control signals from control circuitry 2402 (via the link between communication interface 2422 and communication interface 2430) and, responsive thereto, to send selected drive signals to a corresponding hardware element within screen 2406, the drive signals causing the corresponding hardware element to operate in a particular manner. In particular, pixel array driver circuitry 2432 is configured to send selected drive signals to a pixel array 2442 within screen 2406, adaptable light manipulator driver circuitry 2434 is configured to send selected drive signals to an adaptable light manipulator 2444 within screen elements 2406, and optional light generator driver circuitry 2436 is configured to send selected drive signals to an optional light generator 2446 within screen 2406.

In one example mode of operation, processing unit 2414 operates pursuant to control logic to receive video content via media interface 2420 and to generate control signals necessary to cause driver circuitry 2404 to render such video content to screen 2406 in accordance with specified settings for regionally adjustable characteristics of a screen assembly, which may include adaptable light manipulator 2444 and/or light generator 2446, for example. The control logic that is executed by processing unit 2414 may be retrieved, for example, from a primary memory or a secondary storage device connected to processing unit 2414 via communication infrastructure 2412 as discussed above. The control logic may also be retrieved from some other local or remote source. Where the control logic is stored on a computer readable medium, that computer readable medium may be referred to herein as a computer program product.

Among other features, driver circuitry 2404 may be controlled in a manner previously described to send coordinated drive signals necessary for simultaneously displaying two-dimensional images, three-dimensional images and multi-view three-dimensional content via different display regions of the screen. The manner in which pixel array 2442, adaptable light manipulator 2444 (e.g., an adaptable parallax barrier), and light generator 2446 may be manipulated in a coordinated fashion to perform this function was described previously herein. Note that in accordance with certain implementations (e.g., implementations in which pixel array comprises an OLED/PLED pixel array), screen 2406 need not include light generator 2446.

In one embodiment, at least part of the function of generating control signals necessary to cause pixel array 2442, adaptable light manipulator 2444 and light generator 2446 to render video content to screen 2406 in accordance with specified settings for regionally adjustable characteristics of a screen assembly is performed by drive signal processing circuitry 2438 which is integrated within driver circuitry 2404. Such circuitry may operate, for example, in conjunction with and/or under the control of processing unit 2414 to generate the necessary control signals.

In certain implementations, control circuitry 2402, driver circuitry 2404 and screen elements 2406 are all included within a single housing. For example and without limitation, all these elements may exist within a television, a laptop computer, a tablet computer, or a telephone. In accordance with such an implementation, the link 2452 formed between communication interfaces 2422 and 2430 may be replaced by a direct connection between driver circuitry 2404 and communication infrastructure 2412. In an alternate implementation, control circuitry 2402 is disposed within a first housing, such as set top box or personal computer, and driver circuitry 2404 and screen 2406 are disposed within a second housing, such as a television or computer monitor. The set top box may be any type of set top box including but not limited to fiber, Internet, cable, satellite, or terrestrial digital.

As described above, instances of content may be presented in respective areas of a screen surface (e.g., screen surface 1718 or 1918). FIG. 25 depicts a desktop 2500 (e.g., a screen surface) that includes a variety of areas in which respective instances of content may be presented in accordance with an embodiment. Desktop 2500 may be serviced by operating system (OS) objects, internet delivered media objects, boundaries, icons, etc., that are all subject to user setup and/or via a user's live interaction. The areas of desktop 2500 may include object perimeters, moving 3D objects, 2D or 3D icons or otherwise with 2D or 3D boundaries or interiors, etc. The exemplary areas of desktop 2500 shown in FIG. 25 will now be described.

Desktop 2500 includes a background having a 2D sky area 2501 and a 3D grass region 2503 that appears to stretch far into the distance. Desktop 2500 further includes unselected icons 2513, 2515, and 2519 of random or arbitrary shapes which seem to be floating in mid-air in local 3D. Icons 2513 and 2519 may contain OS generated content, and icon 2515 may contain 3D content delivered live via an external server, for example. In accordance with this example, the 3D content in icon 2515 may be actively changing and/or moving around. Desktop 2500 further includes a selected icon 2517 which seems to be moving closer then farther away in a cycle, while the window 2525 that was opened and relates to selected icon 2517 has a boundary region 2511 that seems to actively change in synchrony therewith.

Desktop 2500 also includes an active, moving 2D or 3D object 2521 that has a non-rectangular boundary. Desktop 2500 further includes a pointer icon 2523 (illustrated as an arrow) used to assist a viewer input and display control architecture 2529 that may be anything illustrated and discussed in the present application, and through which screen region configuration commands (command 1, command 2, etc.) can be accessed via, for example, a right click that opens a pop-up window 2525 or other type of window. Desktop 2500 also includes a rectangular window 2505 with 3D icons 2507 that may move and present local or delivered content, a 2D or 3D content screen 2509 (2D text or 3D movie for example originating remotely), and a 2D or 3D boundary 2511 as mentioned above related to the selected icon 2517.

Viewer input and display control architecture 2529 represents all types of integrated and multiple-housing display and viewer control architectures. For instance, architecture 2529 may include one or more user input interfaces configured to receive user input. Examples of a user input interface include but are not limited to a remote control device, a traditional computer input device such as a keyboard or mouse, a touch screen, a gamepad or other type of gaming console input device, or one or more sensors including but not limited to video cameras, microphones and motion sensors. Such user input interface may generate an input signal that specifies settings for regionally adjustable characteristics of a screen assembly for presentation of the instances of content in the respective areas of desktop 2500, for example, based on the user input. For instance, architecture 2529 may include elements, such as those described above with reference to control unit 2300 of FIG. 23 for enabling the user to control the settings of the regionally adjustable characteristics of the screen assembly.

Architecture 2529 may include driver circuitry (e.g., pixel array driver circuitry, adaptable light manipulator driver circuitry, and/or light generator driver circuitry) that generates drive signals for causing corresponding hardware element(s) (e.g., a pixel array, an adaptable light manipulator, and/or a light generator) to operate in a particular manner. Such driver circuitry may be controlled by control circuitry to send coordinated drive signals necessary for simultaneously displaying two-dimensional images, three-dimensional images and multi-view three-dimensional content via the different areas of desktop 2500, as described herein. For instance, the control circuitry may control the driver circuitry in response to the input signal(s) that are generated by the user input interface(s).

The various elements of architecture 2529 may be all included within a single housing, such as a television, a laptop computer, a tablet computer, or a telephone. Alternatively, such elements may be disposed among multiple housings. For instance, the control circuitry may be disposed within a first housing, such as set top box or personal computer, and the driver circuitry and a screen via which desktop 2500 is presented may be disposed within a second housing, such as a television or computer monitor. The set top box may be any type of set top box including but not limited to fiber, Internet, cable, satellite, or terrestrial digital.

It will be recognized that any combination of the various areas in desktop 2500 may partially overlap, fully overlap, not overlap, be configured such that an area is within another area, etc. Moreover, each of the areas may be any suitable shape.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A display system, responsive to viewer input, that has a screen surface supporting presentation of both first visual content in a first area of the screen surface and second visual content in a second area of the screen surface, the display system comprising:
    a pixel array;
    an adaptable screen assembly that assists the pixel array in presenting both the first visual content in the first area of the screen surface and the second visual content in the second area of the screen surface, the adaptable screen assembly having a regionally adjustable characteristic, and the adaptable screen assembly applies a first setting for the regionally adjustable characteristic to a first region of the adaptable screen assembly to support the first visual content in the first area of the screen surface, the regionally adjustable characteristic including at least a three-dimensional intensity control that indicates a number of perspectives that are represented by the first visual content or the second visual content; and
    circuitry that delivers a control signal to the adaptable screen assembly to cause application of a second setting for the regionally adjustable characteristic to a second region of the adaptable screen assembly to support the second visual content in the second area of the screen surface, the second setting being different from the first setting, and the control signal being generated in response to the viewer input.

2. The display system of claim 1, wherein the regionally adjustable characteristic further includes a brightness control;
    wherein the first setting includes a first region brightness setting; and
    wherein the second setting includes a second region brightness setting that is different from the first region brightness setting.

3. The display system of claim 1, wherein the regionally adjustable characteristic further includes a contrast control;
    wherein the first setting includes a first image contrast setting; and
    wherein the second setting includes a second image contrast setting that is different from the first image contrast setting.

4. The display system of claim 1,
    wherein the first setting includes a first three-dimensional intensity setting; and
    wherein the second setting includes a second three-dimensional intensity setting that is different from the first three-dimensional intensity setting.

5. The display system of claim 1, wherein the adaptable screen assembly comprises:
    a backlight that includes a plurality of light sources;
    wherein a first subset of the plurality of light sources is included in the first region of the adaptable screen assembly; and
    wherein a second subset of the plurality of light sources is included in the second region of the adaptable screen assembly.

6. The display system of claim 1, wherein the adaptable screen assembly comprises:
    a parallax barrier that includes a plurality of barrier elements;
    wherein a first subset of the plurality of barrier elements is included in the first region of the adaptable screen assembly; and
    wherein a second subset of the plurality of barrier elements is included in the second region of the adaptable screen assembly.

7. A display controller, responsive to viewer input, that interacts to control a display, the display having a pixel array, a screen assembly, and a screen surface, the screen surface supporting presentation of both first visual content in a first area of the screen surface and second visual content in a second area of the screen surface, the display controller comprising:
    interface circuitry through which an input signal generated in response to the viewer input is received;
    processing circuitry coupled to the interface circuitry;
    output circuitry coupled to the processing circuitry and that couples with the display;
    the processing circuitry, prior to the receipt of the input signal, sends control signals via the output circuitry to the display intended to produce both a first configuration of a first portion of the screen assembly and a second configuration of a second portion of the screen assembly, the first portion being associated with the first area of the screen surface, the second portion being associated with the second area of the screen surface, the first configuration including a first three-dimensional intensity control setting that indicates a number of perspectives that are represented by the first visual content and the first configuration being different from the second configuration; and
    the processing circuitry, in response to the receipt of the input signal, delivers via the output circuitry a modification signal to the display to cause application of a third configuration to the second portion of the screen assembly to modify a visual characteristic associated with the second visual content, the third configuration being different from the second configuration.

8. The display controller of claim 7, wherein the first configuration further includes a first brightness control setting that is associated with a first region brightness;
    wherein the second configuration includes a second brightness control setting that is associated with a second region brightness, the second brightness control setting being different from the first brightness control setting; and
    wherein the third configuration includes a third brightness control setting that is associated with a third region brightness, the third brightness control setting being different from the second brightness control setting.

9. The display controller of claim 7, wherein the first configuration further includes a first contrast control setting that is associated with a first image contrast;
    wherein the second configuration includes a second contrast control setting that is associated with a second image contrast, the second contrast control setting being different from the first contrast control setting; and
    wherein the third configuration includes a third contrast control setting that is associated with a third image contrast, the third contrast control setting being different from the second contrast control setting.

10. The display controller of claim 7,
wherein the second configuration includes a second three-dimensional intensity control setting that is associated with a second three-dimensional intensity, the second three-dimensional intensity control setting being different from the first three-dimensional intensity control setting; and
wherein the third configuration includes a third three-dimensional intensity control setting that is associated with a third three-dimensional intensity, the third three-dimensional intensity control setting being different from the second three-dimensional intensity control setting.

11. The display controller of claim 7, wherein the first configuration includes a configuration of a first subset of light sources that is included in a first portion of a backlight that is included in the first portion of the screen assembly;
wherein the second configuration includes an initial configuration of a second subset of the light sources that is included in a second portion of the backlight that is included in the second portion of the screen assembly, the configuration of the first subset being different from the initial configuration of the second subset; and
wherein the third configuration includes a modified configuration of the second subset of the light sources, the initial configuration of the second subset being different from the modified configuration of the second subset.

12. The display controller of claim 7, wherein the first configuration further includes a configuration of a first subset of barrier elements that is included in a first portion of a parallax barrier that is included in the first portion of the screen assembly;
wherein the second configuration includes an initial configuration of a second subset of the barrier elements that is included in a second portion of the parallax barrier that is included in the second portion of the screen assembly, the configuration of the first subset being different from the initial configuration of the second subset; and
wherein the third configuration includes a modified configuration of the second subset of the barrier elements, the initial configuration of the second subset being different from the modified configuration of the second subset.

13. A display controller, responsive to viewer input, that interacts to control a display, the display having a screen supporting presentation of both first visual content in a first area of the screen and second visual content in a second area of the screen, the second visual content comprising three dimensional content, the display controller comprising:

interface circuitry through which an input signal generated in response to the viewer input is received;
processing circuitry coupled to the interface circuitry;
output circuitry coupled to the processing circuitry and that couples with the display;
the processing circuitry, prior to the receipt of the input signal, sends control signals via the output circuitry to the display intended to produce both a first configuration of the first visual content associated with the first area of the screen and a second configuration of the second visual content associated with the second area of the screen, the second configuration being a three-dimensional configuration, the first configuration being different from the second configuration; and
the processing circuitry, in response to the receipt of the input signal, delivers via the output circuitry a modification signal to the display to cause modification of the second configuration that will correspondingly change a three-dimensional characteristic of the second visual content, the three-dimensional characteristic including a number of perspectives that are represented by the second visual content.

14. The display controller of claim 13, wherein the first configuration is a two-dimensional configuration.

15. The display controller of claim 13, wherein the first configuration is another three-dimensional configuration.

16. The display controller of claim 13, wherein the three-dimensional characteristic of the second visual content further includes a cumulative brightness that is associated with a plurality of perspectives that are included in the second visual content.

17. The display controller of claim 13, wherein the three-dimensional characteristic further includes a specified subset of perspectives that is represented by the second visual content.

18. The display controller of claim 13, wherein the modification signal includes a control signal that is configured to control a plurality of pixels in a pixel array of the display to at least assist in the modification of the second configuration.

19. The display controller of claim 13, wherein the modification signal includes a control signal that is configured to control a plurality of barrier elements that are included in a parallax barrier of the display to at least assist in the modification of the second configuration.

20. The display controller of claim 13, wherein the modification signal includes a control signal that is configured to control a plurality of light sources that are included in a backlight of the display to at least assist in the modification of the second configuration.

* * * * *

UNITED STATES PATENT AND TRADEMARK OFFICE
CERTIFICATE OF CORRECTION

PATENT NO. : 9,204,138 B2  Page 1 of 1
APPLICATION NO. : 12/982309
DATED : December 1, 2015
INVENTOR(S) : James D. Bennett et al.

It is certified that error appears in the above-identified patent and that said Letters Patent is hereby corrected as shown below:

In column 38, line 43, in claim 19, delete "arc" and insert -- are --, therefor.

Signed and Sealed this
Third Day of May, 2016

Michelle K. Lee
*Director of the United States Patent and Trademark Office*